(12) United States Patent
Ertas et al.

(10) Patent No.: US 12,553,381 B2
(45) Date of Patent: *Feb. 17, 2026

(54) GEARBOX ASSEMBLY WITH LUBRICANT EXTRACTION VOLUME RATIO

(71) Applicants: General Electric Company, Evendale, OH (US); GE Avio S.r.l., Rivalta di Turin (IT)

(72) Inventors: Bugra H. Ertas, Niskayuna, NY (US); Xiaohua Zhang, Glenville, NY (US); Miriam Manzoni, Rivalta di Turin (IT); Flavia Turi, Bari (IT); Andrea Piazza, Turin (IT); Arthur W. Sibbach, Boxford, MA (US); Brandon W. Miller, Middletown, OH (US)

(73) Assignees: GENERAL ELECTRIC COMPANY, Evendale, OH (US); GE AVIO S.R.L., Rivalta di Torino (IT)

( * ) Notice: Subject to any disclaimer, the term of this patent is extended or adjusted under 35 U.S.C. 154(b) by 0 days.

This patent is subject to a terminal disclaimer.

(21) Appl. No.: 19/223,862

(22) Filed: May 30, 2025

(65) Prior Publication Data

US 2025/0290447 A1    Sep. 18, 2025

Related U.S. Application Data

(63) Continuation of application No. 18/972,172, filed on Dec. 6, 2024, now Pat. No. 12,326,115, which is a (Continued)

(30) Foreign Application Priority Data

Jun. 22, 2022    (IT) .................. 102022000013213

(51) Int. Cl.
F02C 7/06        (2006.01)
F16H 57/04       (2010.01)
F16N 7/38        (2006.01)

(52) U.S. Cl.
CPC ........... *F02C 7/06* (2013.01); *F16H 57/0434* (2013.01); *F16N 7/38* (2013.01); *F05D 2260/98* (2013.01);
(Continued)

(58) Field of Classification Search
CPC ...... F16N 7/38; F02C 7/06; F02C 7/36; F05D 2260/98; F05D 2210/02; F05D 2260/40311; F16H 57/0408; F16H 57/0479

See application file for complete search history.

(56) References Cited

U.S. PATENT DOCUMENTS 2,860,648 A * 11/1958 Harrison ................ B64D 37/22
                                                244/135 R
3,529,698 A *  9/1970 Nelson ................. F16H 57/0447
                                                184/6.12
(Continued)

FOREIGN PATENT DOCUMENTS

DE    2904960 A1    8/1980
EP    2148114 A1    1/2010
(Continued)

*Primary Examiner* — Michael A Riegelman
(74) *Attorney, Agent, or Firm* — Venable LLP; Peter T. Hrubiec; Michele V. Frank

(57) ABSTRACT

A gas turbine engine includes a gearbox assembly that includes a gearbox and a gutter for collecting a gearbox lubricant scavenge flow from the gearbox. The gutter is characterized by a lubricant extraction volume ratio between 0.01 and 0.3, inclusive of the endpoints. The lubricant extraction volume ratio defined by:

(Continued)

$$\frac{V_G}{V_{GB}}.$$

$V_G$ is a gutter volume of the gutter and $V_{GB}$ is a gearbox volume. The gas turbine engine includes a lubricant flow control system that includes a variable flow lubricant pump that generates a pump variable flow of lubricant to the gearbox assembly. The gearbox assembly has a variable consumption demand for delivery of lubricant. A lubricant flow controller is configured to generate a pump control command for the variable flow lubricant pump to produce the pump variable flow of lubricant based on the variable consumption demand.

20 Claims, 9 Drawing Sheets

Related U.S. Application Data continuation-in-part of application No. 18/068,017, filed on Dec. 19, 2022.

(52) U.S. Cl.
CPC ...... *F16N 2210/02* (2013.01); *F16N 2250/40* (2013.01)

(56) References Cited

U.S. PATENT DOCUMENTS

| | | | | |
|---|---|---|---|---|
| 4,170,873 A * | 10/1979 | Milo | F01D 25/20 | 60/39.08 |
| 4,245,465 A * | 1/1981 | Milo | F01D 25/18 | 60/39.08 |
| 4,845,483 A * | 7/1989 | Negishi | G06K 15/12 | 347/225 |
| 5,141,179 A * | 8/1992 | Gautier | B64D 37/22 | 137/574 |
| 5,845,483 A * | 12/1998 | Petrowicz | F02C 7/262 | 60/788 |
| 6,223,616 B1 * | 5/2001 | Sheridan | F16H 1/2827 | 184/6.12 |
| 6,626,141 B2 * | 9/2003 | Choi | F01M 1/20 | 123/196 R |
| 6,793,042 B2 * | 9/2004 | Brouillet | F01D 25/18 | 184/6.11 |
| 7,213,682 B2 * | 5/2007 | Gibson | F16H 57/0421 | 184/6.12 |
| 7,506,724 B2 * | 3/2009 | Delaloye | F01D 25/18 | 184/6.4 |
| 7,662,059 B2 * | 2/2010 | McCune | F01D 25/20 | 184/6.12 |
| 7,815,536 B2 * | 10/2010 | Jansen | F16H 1/46 | 290/55 |
| 7,849,668 B2 * | 12/2010 | Sheridan | F01D 25/20 | 384/473 |
| 8,007,253 B2 * | 8/2011 | Dooley | F04D 29/047 | 415/72 |
| 8,215,454 B2 * | 7/2012 | Portlock | F02C 7/36 | 184/6.12 |
| 8,307,626 B2 * | 11/2012 | Sheridan | F01D 25/20 | 184/29 |
| 8,401,760 B2 * | 3/2013 | Payne | F02C 7/06 | 701/30.9 |
| 8,602,165 B2 * | 12/2013 | Szolomayer | F02C 7/06 | 137/574 |
| 8,702,373 B1 * | 4/2014 | Valva | F16H 57/0495 | 416/174 |
| 8,734,122 B2 * | 5/2014 | Murray | F01M 1/20 | 123/196 CP |
| 8,740,549 B2 * | 6/2014 | Shashank | F02C 6/12 | 415/110 |
| 8,833,086 B2 * | 9/2014 | Parnin | F16H 57/0486 | 60/39.08 |
| 9,086,055 B2 * | 7/2015 | Subramaniam | F03D 80/70 | |
| 9,404,381 B2 * | 8/2016 | NguyenLoc | F16H 57/0441 | |
| 9,404,420 B2 * | 8/2016 | Gallet | F16H 57/0456 | |
| 9,790,804 B2 * | 10/2017 | Lepretre | F02C 7/06 | |
| 9,903,227 B2 * | 2/2018 | Cigal | F01D 25/18 | |
| 10,060,289 B2 * | 8/2018 | Sheridan | B01D 19/0068 | |
| 10,082,105 B2 * | 9/2018 | McCune | F16H 57/04 | |
| 10,145,276 B2 * | 12/2018 | Parnin | F01M 11/10 | |
| 10,167,873 B2 * | 1/2019 | Sheridan | F02C 7/32 | |
| 10,196,926 B2 * | 2/2019 | Ketchum | F01D 25/20 | |
| 10,208,624 B2 * | 2/2019 | Duong | F02C 3/107 | |
| 10,247,020 B2 * | 4/2019 | McCune | F01D 9/065 | |
| 10,267,233 B2 * | 4/2019 | Mastro | F02C 3/107 | |
| 10,287,915 B2 * | 5/2019 | McCune | F01D 25/18 | |
| 10,316,855 B2 * | 6/2019 | Mastro | F04D 29/329 | |
| 10,364,881 B2 * | 7/2019 | Pikovsky | F16H 57/043 | |
| 10,371,007 B2 * | 8/2019 | Cigal | F01D 25/20 | |
| 10,513,949 B2 * | 12/2019 | Parnin | F16H 57/0442 | |
| 10,526,913 B2 * | 1/2020 | Roberge | F02C 7/36 | |
| 10,526,973 B2 | 1/2020 | Waissi et al. | | |
| 10,570,824 B2 * | 2/2020 | Schwarz | F16H 57/0482 | |
| 10,605,351 B2 * | 3/2020 | Sheridan | F16H 57/0479 | |
| 10,634,053 B2 * | 4/2020 | Schwarz | F16H 57/0471 | |
| 10,711,877 B2 * | 7/2020 | Fisher | F16H 57/0486 | |
| 10,794,467 B2 * | 10/2020 | Kurz-Hardjosoekatmo | F16H 57/0457 | |
| 10,801,413 B2 * | 10/2020 | Roberge | F02C 6/14 | |
| 10,851,689 B2 * | 12/2020 | Engel | F01M 11/065 | |
| 10,900,422 B2 | 1/2021 | Logan et al. | | |
| 11,060,417 B2 | 7/2021 | McCune | | |
| 11,066,945 B2 * | 7/2021 | McCune | F01D 25/18 | |
| 11,073,041 B2 * | 7/2021 | Uhkoetter | F01M 1/02 | |
| 11,085,521 B2 * | 8/2021 | Edwards | F16N 7/16 | |
| 11,203,974 B2 * | 12/2021 | Sheridan | F02K 3/06 | |
| 11,221,066 B2 * | 1/2022 | McCune | F16H 57/08 | |
| 11,236,637 B2 * | 2/2022 | Parnin | F01M 11/067 | |
| 11,268,453 B1 * | 3/2022 | Desjardins | F16H 57/0479 | |
| 11,313,454 B2 * | 4/2022 | Davies | F02C 7/36 | |
| 11,339,725 B2 * | 5/2022 | Simon | F16H 1/28 | |
| 11,371,436 B2 * | 6/2022 | Legare | F01D 21/003 | |
| 11,391,363 B2 * | 7/2022 | Sbabo | F16H 57/0445 | |
| 11,512,615 B2 * | 11/2022 | Dupays | F01M 11/12 | |
| 11,719,127 B2 * | 8/2023 | Davis | F01D 25/32 | 184/6.11 |
| 11,781,506 B2 * | 10/2023 | Kupratis | F02K 3/075 | 60/792 |
| 11,808,214 B2 * | 11/2023 | Payyoor | F02C 7/06 | |
| 12,259,036 B2 * | 3/2025 | Sheridan | F01D 19/00 | |
| 12,320,418 B2 * | 6/2025 | Ertas | F16H 57/0408 | |
| 12,326,115 B2 * | 6/2025 | Ertas | F16N 7/38 | |
| 2011/0168494 A1 * | 7/2011 | Subramaniam | F03D 80/70 | 184/6.12 |
| 2012/0192974 A1 * | 8/2012 | Szolomayer | B01D 45/16 | 137/571 |
| 2013/0319006 A1 * | 12/2013 | Parnin | F02C 3/107 | 184/6.12 |
| 2015/0089918 A1 * | 4/2015 | Valva | F02C 7/36 | 415/111 |
| 2015/0267618 A1 * | 9/2015 | Schwarz | F16H 1/36 | 29/889 |
| 2016/0032773 A1 * | 2/2016 | James | F01D 25/16 | 416/170 R |
| 2017/0051823 A1 * | 2/2017 | Pikovsky | F01D 25/18 | |
| 2017/0108110 A1 * | 4/2017 | Sheridan | F16N 31/00 | |
| 2019/0113127 A1 * | 4/2019 | Gravina | F02C 7/06 | |
| 2019/0170004 A1 * | 6/2019 | McCune | F01D 25/18 | |
| 2019/0271236 A1 | 9/2019 | McCune | | |
| 2019/0323597 A1 * | 10/2019 | Sheridan | F16H 57/0482 | |
| 2019/0376416 A1 * | 12/2019 | Mastro | F02C 7/36 | |
| 2020/0165980 A1 * | 5/2020 | Di Giovanni | F02C 7/36 | |
| 2020/0200042 A1 * | 6/2020 | Charrier | F01D 25/18 | |
| 2021/0017910 A1 * | 1/2021 | Spruce | F16H 1/06 | |
| 2021/0022262 A1 | 1/2021 | Shionoya et al. | | |
| 2021/0148453 A1 * | 5/2021 | Pennacino | F16H 57/0427 | |

(56) References Cited

U.S. PATENT DOCUMENTS

| | | | | |
|---|---|---|---|---|
| 2021/0222767 A1* | 7/2021 | Jabido | | F02K 3/025 |
| 2021/0324762 A1* | 10/2021 | Anglin | | F01D 11/003 |
| 2022/0316584 A1* | 10/2022 | Jacquemard | | F16H 57/0423 |
| 2022/0397040 A1* | 12/2022 | Molesini | | F16H 57/0427 |
| 2023/0021913 A1* | 1/2023 | Levisse | | F02C 3/067 |
| 2023/0101143 A1* | 3/2023 | Williams | | F16H 57/0435 |
| | | | | 184/6.11 |
| 2023/0313738 A1* | 10/2023 | Zhang | | F02C 7/06 |
| | | | | 184/6.11 |
| 2023/0313880 A1* | 10/2023 | Zhang | | F02C 7/36 |
| | | | | 60/805 |
| 2023/0349326 A1* | 11/2023 | Turnquist | | F02C 7/36 |
| 2023/0417185 A1* | 12/2023 | Ertas | | F16H 57/0486 |
| 2024/0426374 A1* | 12/2024 | Miller | | F16H 57/0442 |
| 2025/0101911 A1* | 3/2025 | Ertas | | F16H 57/0434 |
| 2025/0101916 A1* | 3/2025 | Ertas | | F16N 7/38 |
| 2025/0102058 A1* | 3/2025 | Ertas | | F01D 15/12 |
| 2025/0122835 A1* | 4/2025 | Ertas | | F16H 57/02 |
| 2025/0122836 A1* | 4/2025 | Ertas | | F02C 7/36 |
| 2025/0122842 A1* | 4/2025 | Ertas | | F02C 7/06 |
| 2025/0122848 A1* | 4/2025 | Ertas | | F02K 1/386 |
| 2025/0137529 A1* | 5/2025 | Ertas | | F16H 57/045 |

FOREIGN PATENT DOCUMENTS

| | | |
|---|---|---|
| EP | 2980368 A1 | 2/2016 |
| EP | 2855859 B1 | 1/2019 |
| FR | 3127024 A1 | 3/2023 |
| FR | 3127025 A1 | 3/2023 |
| FR | 3129436 A1 | 5/2023 |
| FR | 3129690 A1 | 6/2023 |
| FR | 3130747 A1 | 6/2023 |
| FR | 3130875 A1 | 6/2023 |
| WO | 2015147949 A2 | 10/2015 |

\* cited by examiner

GEARBOX ASSEMBLY WITH LUBRICANT EXTRACTION VOLUME RATIO

CROSS REFERENCE TO RELATED APPLICATIONS

This application is a continuation of U.S. patent application Ser. No. 18/972,172 filed on Dec. 6, 2024, which is a continuation-in-part application of U.S. patent application Ser. No. 18/068,017 filed Dec. 19, 2022, which claims the benefit of Italian Patent Application No. 102022000013213 filed on Jun. 22, 2022, the entire contents of which are hereby incorporated by reference in their entireties.

TECHNICAL FIELD

The present disclosure relates to a gearbox assembly for an engine, for example, a gas turbine engine for an aircraft.

BACKGROUND

Lubricant is used in a power gearbox to lubricate gears and rotating parts in the gearbox. Lubricant may be supplied to lubricate the mesh between the gears. As the gears of the gearbox assembly rotate during operation, the lubricant is expelled outwardly. The lubricant is captured by a gutter.

BRIEF DESCRIPTION OF THE DRAWINGS

Features and advantages of the present disclosure will be apparent from the following, more particular, description of various exemplary embodiments, as illustrated in the accompanying drawings, wherein like reference numbers generally indicate identical, functionally similar, or structurally similar elements.

DETAILED DESCRIPTION

Figure 1:
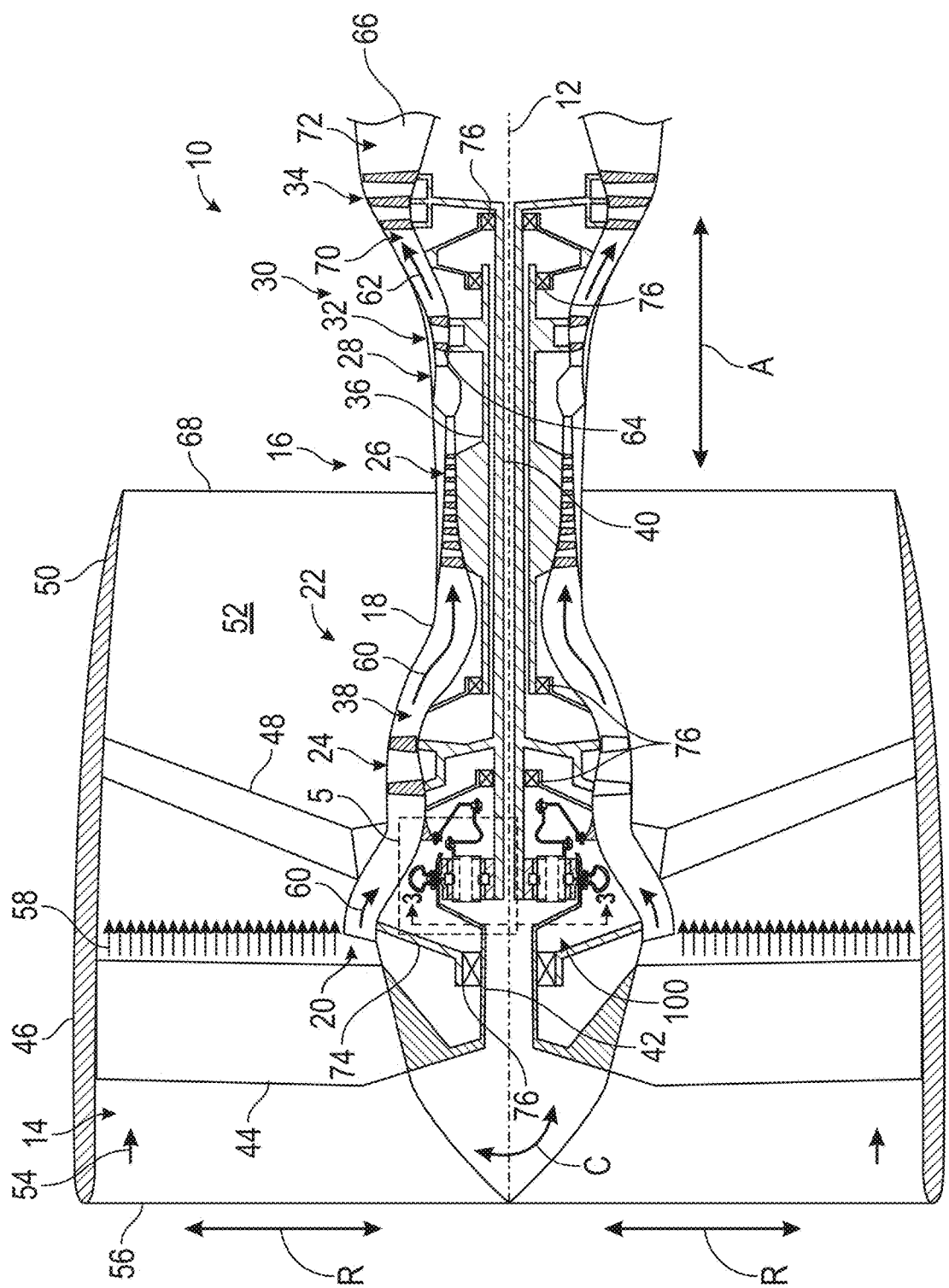
FIG. 1 illustrates a schematic, cross-sectional view of an engine, taken along a centerline axis of the engine, according to an embodiment of the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the present disclosure.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. More particularly, forward and aft are used herein with reference to a direction of travel of the vehicle and a direction of propulsive thrust of the gas turbine engine.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

A turbine engine can be configured as a geared engine. Geared engines include a power gearbox utilized to transfer power from a turbine shaft to a fan. Such gearboxes may include a sun gear, a plurality of planet gears, and a ring gear. The sun gear meshes with the plurality of planet gears and the plurality of planet gears mesh with the ring gear. In operation, the gearbox transfers the torque transmitted from a turbine shaft operating at a first speed to a fan shaft rotating at a second, lower speed. For a planet configuration of the gearbox, the sun gear may be coupled to the mid-shaft of a lower pressure turbine rotating at the first speed. The planet gears, intermeshed with the sun gear, then transfer this torque to the fan shaft through a planet carrier. In a star configuration, a ring gear is coupled to the fan shaft.

In either configuration, it is desired to increase efficiency. There are several effects that can negatively impact a gearbox's efficiency. For example, gearboxes experience windage across rotating components (e.g., in the bearing, in rolling surfaces, in the gears), that is, shear and drag forces are generated across the gears, pins, and bearings of the gearboxes. In another example, the rotating components of the gearbox experience friction losses due to the relative rotation between components. The windage and friction losses reduce the efficiency of the gearbox. In addition to reducing efficiency, windage and friction losses contribute to heat generation in gearboxes. The relative rotating surfaces and force transmission between the gears also generates heat in the gearboxes.

When a gearbox operates at higher efficiency a greater percentage of the input power from the LP shaft is transferred to the fan shaft. To improve gearbox efficiency, lubrication is provided to the gearboxes to provide a protective film at the rolling contact surfaces, to lubricate the components, and to remove heat from the gearbox. Lubrication supplied to the gearbox, however, needs to be removed from the gearbox. Buildup of lubrication in the gearbox may reduce efficiency and may not remove the heat from the gearbox. Furthermore, allowing the lubrication in the gearbox to enter other components of the engine may negatively impact operation of the other components. One way to remove lubrication from the gearbox is to scavenge the lubrication through a gutter. The gutter collects lubricant expelled from the gearbox during operation. Gutters are often designed to circumscribe the ring gear, without taking into account the requirements of the engine or the gearbox. This results in gutters that are too large or too small. A gutter that is larger than required for the engine takes up valuable space in the engine, adding weight to the engine and decreasing overall engine efficiency. A gutter that is smaller than required for the engine may not properly scavenge the lubricant from the gearbox, allowing leakage from the gutter and reducing the ability of the lubricant to remove heat from the gearbox. The inventors, seeking ways to improve upon existing gutters in terms of their size/capacity for particular architectures, gearbox types, or mission requirements, tested different gutter configurations to ascertain what factors play into an appropriate gutter sizing.

FIG. 1 illustrates a schematic, cross-sectional view of an engine 10. The engine 10 may be, for example, but not limited to, a turbine engine, such as a gas turbine engine. The engine 10 defines an axial direction A extending parallel to a longitudinal, engine centerline, also referred to as a longitudinal centerline axis 12, a radial direction R that is normal to the axial direction A, and a circumferential direction C about the longitudinal centerline axis 12 (shown in/out of the page in FIG. 1). The engine 10 includes a fan section 14 and a core engine 16 downstream from the fan section 14.

The core engine 16 includes a core engine casing 18 that is substantially tubular and defines an annular inlet 20. The core engine casing 18 encases, in serial flow relationship, a compressor section 22 including a low-pressure compressor 24, also referred to as a booster 24, followed downstream by a high-pressure compressor 26, a combustion section 28, a turbine section 30 including a high-pressure turbine 32 followed downstream by a low-pressure turbine 34, and a jet exhaust nozzle section 72 downstream of the low-pressure turbine 34. A high-pressure shaft 36 drivingly connects the high-pressure turbine 32 to the high-pressure compressor 26 to rotate the high-pressure turbine 32 and the high-pressure compressor 26 in unison. The compressor section 22, the combustion section 28, and the turbine section 30 together define a core air flowpath 38 extending from the annular inlet 20 to the jet exhaust nozzle section 72.

A low-pressure shaft 40 drivingly connects the low-pressure turbine 34 to the booster 24 to rotate the low-pressure turbine 34 and the booster 24 in unison. A gearbox assembly 100 couples the low-pressure shaft 40 to a fan shaft 42 to drive fan blades 44 of the fan section 14. The fan shaft 42 is coupled to a fan frame 74 via one or more engine bearings 76. The one or more engine bearings 76 support rotation of the fan shaft 42. The one or more engine bearings 76 also include engine bearings 76 that support rotation of the high-pressure shaft 36 and engine bearings 76 that support rotation of the low-pressure shaft 40.

The fan blades 44 extend radially outward from the longitudinal centerline axis 12 in the direction R. The fan blades 44 rotate about the longitudinal centerline axis 12 via the fan shaft 42 that is powered by the low-pressure shaft 40 across the gearbox assembly 100. The gearbox assembly 100 adjusts the rotational speed of the fan shaft 42 and, thus, the fan blades 44 relative to the low-pressure shaft 40. That is, the gearbox assembly 100 is a reduction gearbox and power gearbox that delivers a torque from the low-pressure shaft 40 running at a first speed, to the fan shaft 42 coupled to fan blades 44 running at a second, slower speed.

In FIG. 1, the fan section 14 includes an annular fan casing or a nacelle 46 that circumferentially surrounds the fan blades 44 or at least a portion of the core engine 16. The nacelle 46 is supported relative to the core engine 16 by a plurality of circumferentially spaced outlet guide vanes 48. Moreover, an aft section 50 of the nacelle 46 extends circumferentially around a portion of the core engine casing 18 of the core engine 16 to define a bypass airflow passage 52 therebetween.

During operation of the engine 10, a volume of air, represented by airflow 54, enters the engine 10 through an inlet 56 of the nacelle 46 or the fan section 14. As airflow 54 passes across the fan blades 44, a first portion of the airflow 54, represented by bypass airflow 58, is directed or is routed into the bypass airflow passage 52, and a second portion of the airflow 54, represented by core airflow 60, is directed or is routed into an upstream section of the core air flowpath 38 via the annular inlet 20. The ratio between the bypass airflow 58 and the core airflow 60 defines a bypass ratio. The pressure of the core airflow 60 is increased as the core airflow 60 is routed through the high-pressure compressor 26 and into the combustion section 28, where the now highly pressurized core airflow 60 is mixed with fuel and burned to provide combustion products or combustion gases, represented by flow 62.

The combustion gases, via flow 62, are routed into the high-pressure turbine 32 and expanded through the high-pressure turbine 32 where a portion of thermal or of kinetic energy from the combustion gases is extracted via sequential stages of high-pressure turbine stator vanes that are coupled to the core engine casing 18 and high-pressure turbine rotor blades 64 that are coupled to the high-pressure shaft 36, thus, causing the high-pressure shaft 36 to rotate, thereby supporting operation of the high-pressure compressor 26. The combustion gases, via flow 62, are then routed into the low-pressure turbine 34 and expanded through the low-pressure turbine 34. Here, a second portion of thermal and kinetic energy is extracted from the combustion gases via sequential stages of the low-pressure turbine stator vanes that are coupled to the core engine casing 18 and low-pressure turbine rotor blades 66 that are coupled to the low-pressure shaft 40, thus, causing the low-pressure shaft 40 to rotate. This thereby supports operation of the booster 24 and rotation of the fan blades 44 via the gearbox assembly 100.

The combustion gases, via flow 62, are subsequently routed through the jet exhaust nozzle section 72 downstream of the low-pressure turbine 34 to provide propulsive thrust.

The high-pressure turbine 32, the low-pressure turbine 34, and the jet exhaust nozzle section 72 at least partially define a hot gas path 70 for routing the combustion gases, via flow 62, through the core engine 16. Simultaneously, the pressure of the bypass airflow 58 is increased as the bypass airflow 58 is routed through the bypass airflow passage 52 before being exhausted from a fan nozzle exhaust section 68 of the engine 10, also providing propulsive thrust.

The engine 10 depicted in FIG. 1 is by way of example only. In other exemplary embodiments, the engine 10 may have any other suitable configuration. For example, in other exemplary embodiments, the fan section 14 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, or turboshaft engines.

Figure 2:
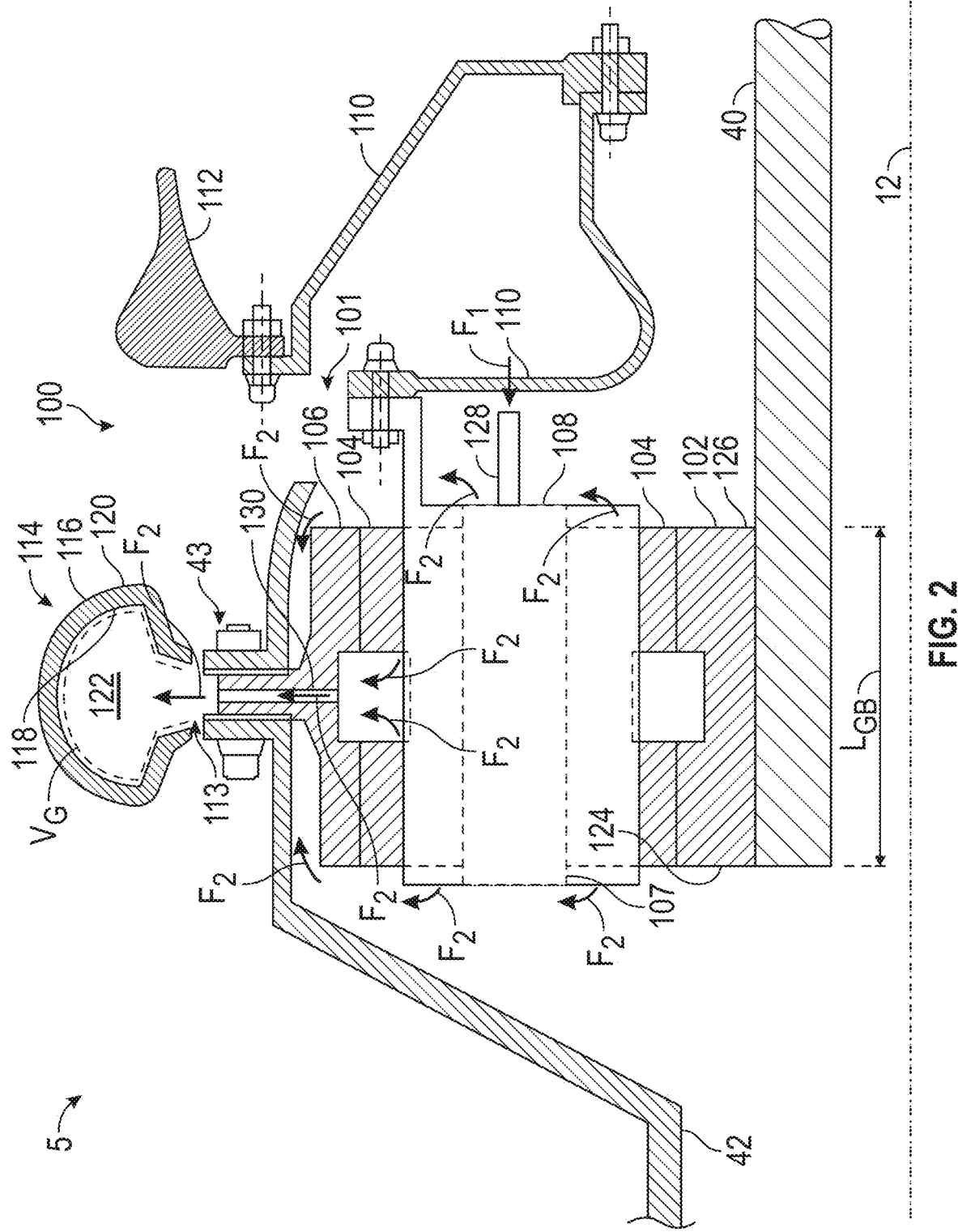
FIG. 2 illustrates a schematic, detail view of the gearbox assembly of the engine of FIG. 1, according to an embodiment of the present disclosure.
Figure 3:
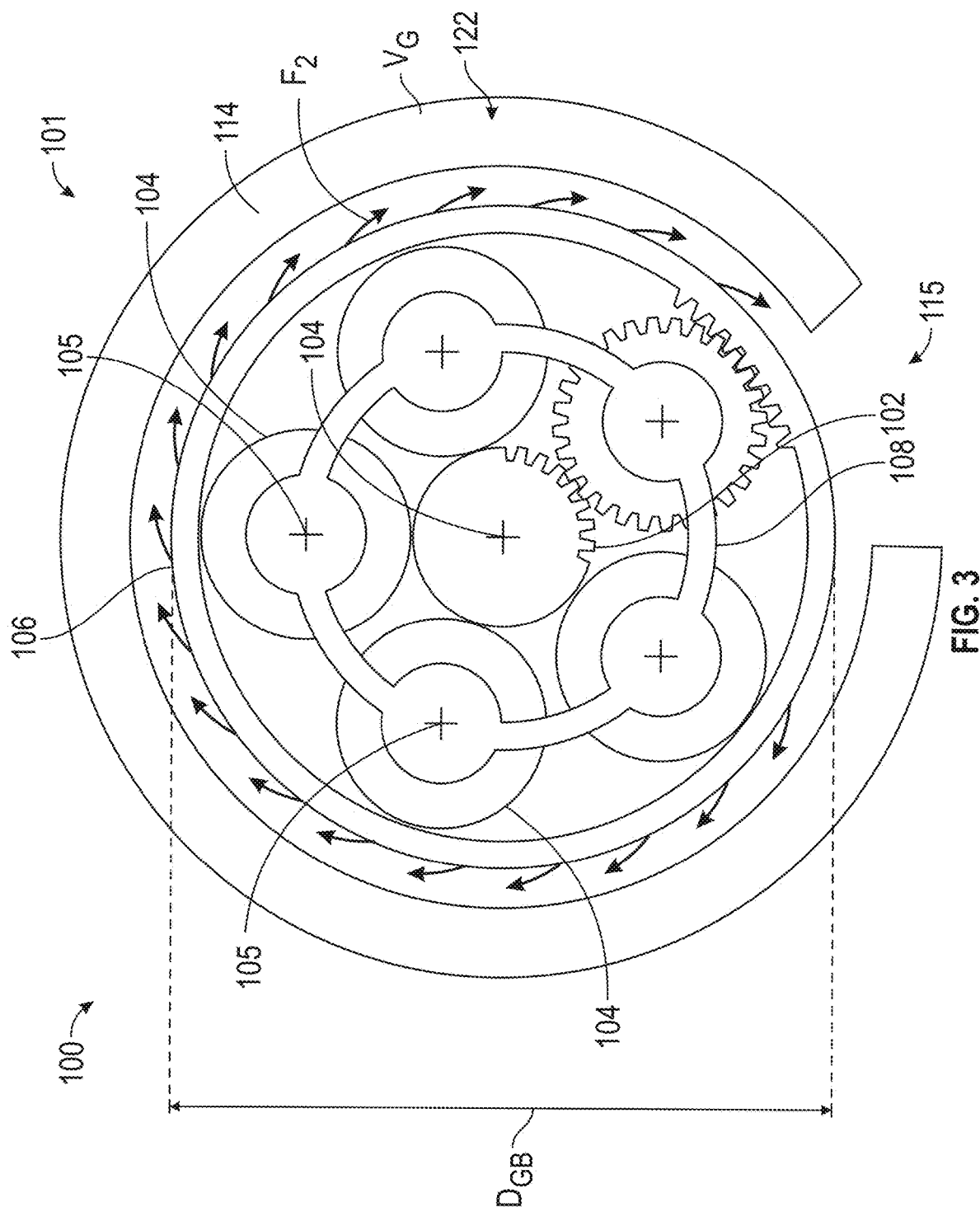
FIG. 3 illustrates a schematic, end view of the gearbox assembly of FIG. 2, taken along line 3-3 of FIG. 1, with the fan shaft omitted for clarity, according to an embodiment of the present disclosure.

FIG. 2 illustrates a detail view 5 of FIG. 1 of the gearbox assembly 100. FIG. 3 illustrates a schematic axial end view, taken along the line 3-3 of FIG. 1, of the gears of the gearbox assembly 100. The fan shaft 42 and a coupling 43 are omitted from FIG. 3 for clarity. Referring to FIGS. 2 and 3, the gearbox assembly 100 includes a gearbox 101 and a gutter 114. The gearbox 101 includes a sun gear 102, a plurality of planet gears 104, and a ring gear 106. The low-pressure turbine 34 (FIG. 1) drives the low-pressure shaft 40, which is coupled to the sun gear 102 of the gearbox assembly 100. The gearbox assembly 100 in turn drives the fan shaft 42.

Referring to FIG. 2, the low-pressure shaft 40 causes the sun gear 102 to rotate about the longitudinal centerline axis 12. Radially outwardly of the sun gear 102, and intermeshing therewith, is the plurality of planet gears 104 that are coupled together by a planet carrier 108. The planet carrier 108 is coupled, via a flex mount 110, to an engine frame 112. The planet carrier 108 constrains the plurality of planet gears 104 while allowing each planet gear of the plurality of planet gears 104 to rotate about a respective planet gear axis 105 (FIG. 3) on a pin 107. Radially outwardly of the plurality of planet gears 104, and intermeshing therewith, is the ring gear 106, which is an annular ring gear 106. The ring gear 106 is coupled to the fan shaft 42 at a coupling 43. The ring gear 106 is coupled via the fan shaft 42 to the fan blades 44 (FIG. 1) in order to drive rotation of the fan blades 44 about the longitudinal centerline axis 12. The gutter 114 includes a gutter wall 116 having an inner surface 118 and an outer surface 120. A gutter volume $V_G$ is defined within an interior 122 of the gutter wall 116. The gutter volume $V_G$ is illustrated by the dashed line in FIG. 2 for illustration purposes, the volume $V_G$ extends all the way to the inner surface 118 of the gutter 114. Although the gutter 114 is depicted with a relatively bell-like shape or tear-drop shape, any shape suitable to collecting lubricant is contemplated.

Although not depicted in FIG. 2, and shown only partially in FIG. 3 for clarity, each of the sun gear 102, the plurality of planet gears 104, and the ring gear 106 comprises teeth about their periphery to intermesh with teeth of the adjacent gears. The gearbox 101 has a gearbox diameter DGB defined by an outer diameter of the gearbox 101. The outer diameter of the gearbox 101 may be the outer diameter of the ring gear 106 such that the gearbox diameter DGB is defined by the outer diameter of the ring gear 106. Referring to FIG. 2, the sun gear 102, the plurality of planet gears 104, and the ring gear 106 are axially aligned such that a forwardmost end 124 of the gears is coplanar and an aftmost end 126 of the gears is coplanar. The gearbox 101 has an axial gearbox length LGB defined from the forwardmost end 124 of the gears to the aftmost end 126 of the gears.

Referring to FIG. 3, the gutter 114 may be circular and may wholly or partially circumscribe the gears of the gearbox assembly 100. For example, the gutter 114 may wholly or partially circumscribe the ring gear 106. Therefore, the gutter 114 is located radially outward of the sun gear 102, the plurality of planet gears 104, and the ring gear 106. The gutter 114 does not rotate with the gears of the gearbox assembly 100.

The gutter 114 includes a scavenge port 115 located at or near the bottom of the gutter 114. The scavenge port 115 allows lubricant collected by the gutter 114 to be removed from the gearbox assembly 100. Although shown as a large opening in the gutter 114, the scavenge port 115 may be any size or shape aperture or port that allows a flow of fluid from the interior 122 of the gutter 114 to a passage or reservoir (not depicted) outside of the gearbox assembly 100. By locating the scavenge port 115 at or near the bottom portion of the gutter 114, gravity may assist in causing the lubricant to flow toward the scavenge port 115 and, thus, may promote removal of the lubricant from the gearbox assembly 100. Once removed from the gutter 114, the lubricant may be recirculated through a lubricant channel 128 (FIG. 2) or collected elsewhere for disposal or removal.

The gearbox assembly 100 of FIGS. 2 and 3 is a star configuration gearbox assembly, in that the planet carrier 108 is held fixed (e.g., via the flex mount 110 to the engine frame 112) and the ring gear 106 is permitted to rotate. That is, the fan section 14 is driven by the ring gear 106. However, other suitable types of gearbox assembly 100 may be employed. In one non-limiting example, the gearbox assembly 100 may be a planetary configuration, in that the planet carrier 108 is coupled to the fan shaft 42 (FIG. 1) via an output shaft to rotate the fan shaft 42, with the ring gear 106 being held stationary or fixed. In this example, the fan section 14 (FIG. 1) is driven by the planet carrier 108. In another non-limiting example, the gearbox assembly 100 may be a differential gearbox in which the ring gear 106 and the planet carrier 108 are both allowed to rotate.

During engine operation, and referring to FIGS. 2 and 3, gears of the gearbox assembly 100 rotate as previously described. A lubricant (e.g., oil) is provided to lubricate the rotating parts of the gearbox assembly 100, including the sun gear 102, the plurality of planet gears 104, the ring gear 106, and the pins 107. A lubricant system (e.g., the lubricant system shown in FIGS. 4 and 5) supplies a flow $F_1$, also referred to as a first lubricant flow $F_1$, of the lubricant through the lubricant channel 128 to supply lubricant to the gearbox assembly 100. As the gears of the gearbox assembly 100 rotate, centrifugal forces expel the lubricant radially outward, away from the longitudinal centerline axis 12, as shown by flow $F_2$, also referred to as a second lubricant flow $F_2$, or a gearbox scavenge flow $F_2$. The flow $F_2$ flows around the ring gear 106 or through a ring gear passage 130 to be collected by the gutter 114. The lubricant flows into a gutter inlet 113. In this manner, lubricant supplied through the lubricant channel 128 is collected in the gutter 114 after flowing through and around the gears and other rotating parts of the gearbox assembly 100.

Figure 4:
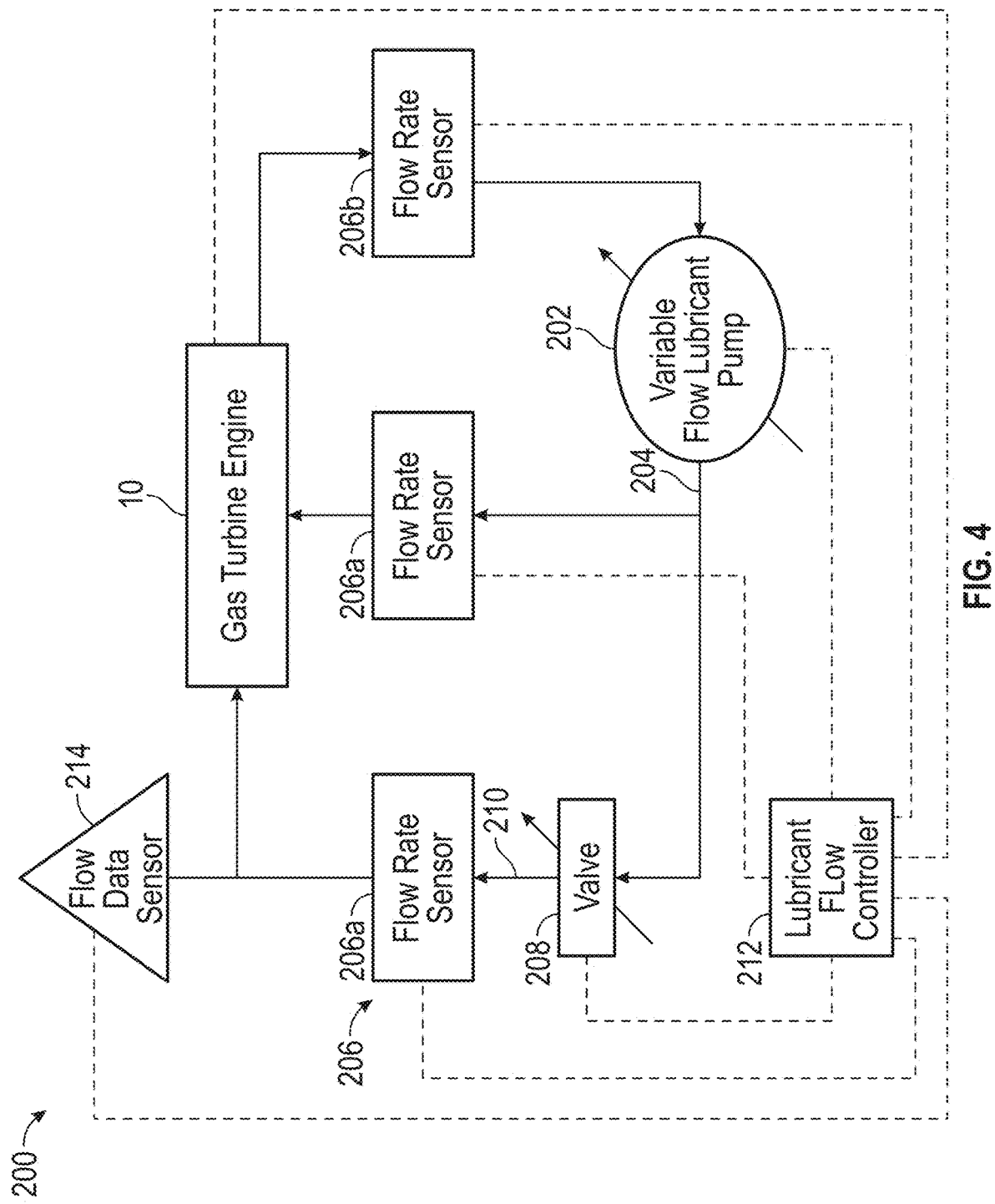
FIG. 4 is a schematic diagram of a lubricant flow control system, according to an embodiment of the present disclosure.

FIG. 4 is a schematic diagram of a lubricant flow control system 200, according to an embodiment of the present disclosure. An embodiment of a lubricant flow control system 200 is depicted that includes a gas turbine engine, also referred to as an engine 10, that is configured to provide power during operation of the engine 10 to a variable flow lubricant pump 202. The variable flow lubricant pump 202 can be configured to receive a shaft mechanical power directly from the engine 10 (e.g., via an offtake shaft powered by either of the low-pressure shaft 40 or the high-pressure shaft 36) or can be powered using other techniques as well. In one non-limiting form, the engine 10 can provide mechanical power to an electrical generator used to produce electricity. In this form, the variable flow lubricant pump 202 can be electrically driven and powered by the electrical generator driven by mechanical power from the engine 10.

The variable flow lubricant pump 202 is used to generate a pump variable flow of lubricant 204, the flow of which is delivered to a lubricant consumer (e.g., the gearbox assembly 100 of FIGS. 1 to 3). The lubricant consumer is associated with operation of the engine 10 and can take the form of any component or system within the engine 10 or any accessory that operates in conjunction with the engine 10. For example, the lubricant consumer can be any of the gearbox assembly, engine bearings, the electrical generator, accessories driven by the engine, etc. The lubricant consumer can use the lubricant provided by the variable flow lubricant pump 202 either as a lubricant or as a heat exchange fluid, or both. The variable flow lubricant pump 202 can take on any variety of form useful to generate the pump variable flow of lubricant 204, including an electrically driven form with speed control, or a variable displacement form. As illustrated, there is no bypass loop to return lubricant to an inlet of the variable flow lubricant pump 202 prior to the lubricant being used by a lubricant consumer. The variable flow lubricant pump 202 is capable of providing a variety of flow rates of lubricant to the lubricant consumer. The variable flow lubricant pump 202 can also provide fast response in flow rate output to changes in a pump control command. The variable flow lubricant pump 202 can provide the pump variable flow of lubricant 204 at a variety of flow rates. For example, the variable flow lubricant pump 202 can include pumping speeds that range from no flow rate, a maximum flow rate, and a partial flow rate. In one non-limiting example, the partial flow rate can include a single partial flow rate, while in another non-limiting example a plurality of partial flow rates is contemplated. The variable flow lubricant pump 202 can include partial flow rates that are discretized between the no flow and the maximum flow rates, while in other embodiments, the partial flow rates are continuously variable between the no flow rate and the maximum flow rate.

The pump variable flow of lubricant 204 is depicted in FIG. 4 as being delivered to two different lubricant circuit branches where each lubricant circuit branch delivers lubricant to a different lubricant consumer. Although the embodiment depicted in FIG. 4 illustrates two lubricant circuit branches, other embodiments may have fewer or greater number of lubricant circuit branches. As depicted, the embodiment shown in FIG. 4 also includes a plurality of flow rate sensors 206 that senses a rate of the lubricant and generates flow rate data indicative of the rate of lubricant. As each of the flow rate sensors 206 in each lubricant circuit branch can be associated with a lubricant consumer, and, given the incompressible nature of the lubricant flowing to the lubricant consumer, the flow rate data can be indicative of a rate of lubricant to the lubricant consumer.

A lubricant flow control valve 208 is positioned downstream of the variable flow lubricant pump 202 and is configured to provide a variable flow of lubricant to the lubricant consumer (e.g., the gearbox assembly 100, the engine bearings, the electrical generator, the accessories driven by the engine, etc.). The lubricant flow control valve 208 can be operated through use of a torque motor or a stepper motor and is structured to further regulate the flow of lubricant in the lubricant circuit branch in which the lubricant flow control valve 208 is located. The lubricant flow control valve 208 can provide a valve variable flow of lubricant 210 at a variety of flow rates to further regulate a flow of lubricant to the lubricant consumer beyond the regulation provided by the variable flow lubricant pump 202. For example, the lubricant flow control valve can provide the variable flow of lubricant 210 using valve positions that range from a fully closed position, a fully opened position, and a partially opened position. In one non-limiting example, the partially opened position can include a single partially opened position, while, in another non-limiting example, a plurality of partially opened positions are contemplated. The lubricant flow control valve 208 can include partially opened positions that are discretized between the fully closed position and the fully opened position, while, in other embodiments, the partially opened positions are continuously variable between the fully opened position and the fully closed position. In one form, the valve variable flow of lubricant 210 is lower than that of the pump variable flow of lubricant 204, such as in the embodiment depicted in FIG. 4, in which the pump variable flow of lubricant 204 is split between lubricant circuit branches. However, in those embodiments that include only one lubricant circuit branch, the valve variable flow of lubricant 210 is the same as the pump variable flow of lubricant 204. Furthermore, in one mode of operation, the lubricant flow control valve 208 may be fully closed, thus rendering the depiction in FIG. 4 as a single circuit branch embodiment until the lubricant flow control valve 208 is opened.

Although the lubricant flow control valve 208 is depicted as a conventional two-way valve having a single inlet fed from the variable flow lubricant pump 202 and a single outlet leading to a lubricant consumer, in some forms the lubricant flow control valve 208 can take on other valve types, including, but not limited to, a three-way valve, a four-way valve, etc. In these alternative forms, the flow rate sensors 206 can be used in each of the split flow lines leading to respective lubricant consumers (or separate locations within a given lubricant consumer).

The flow rate sensors 206 can aid in determining a rate of lubricant that can include a mass flow rate or a volumetric flow rate of lubricant. As depicted in FIG. 4, a flow rate sensor 206 is positioned downstream of the lubricant flow control valve 208, a flow rate sensor 206 is positioned downstream of the variable flow lubricant pump 202 without an intervening lubricant flow control valve 208. Not all embodiments need include a flow rate sensor 206 in all conduits receiving lubricant from the variable flow lubricant pump 202. In some forms, fewer or greater numbers of flow rate sensors 206 can be used. Further to the above, a flow rate sensor 206 can be positioned on a return branch from the engine 10 to the variable flow lubricant pump 202. The flow rate sensor 206 on the return branch can be used to determine a rate of lubricant returning toward the variable flow lubricant pump 202. In this way, the lubricant flow control system 200 includes a first flow rate sensor 206a configured to generate first flow rate data indicative of a rate of lubricant to the lubricant consumer. The lubricant flow control system 200 also includes a second flow rate sensor 206b positioned downstream of the lubricant consumer and configured to generate second flow rate data indicative of a rate of lubricant from the lubricant consumer and returning toward the variable flow lubricant pump 202.

Though the embodiment depicted in FIG. 4 illustrates flow rate sensors 206 on each lubricant circuit branch and return branch, fewer numbers of flow rate sensors 206 can be used. For example, if only knowledge of lubricant delivery to a lubricant consumer is needed, then the flow rate sensor 206 on the return branch to the variable flow lubricant pump 202 may not be needed. In other embodiments, the inclusion of multiple flow rate sensors 206 can be used for fault detection purposes or for failure accommodation purposes.

The flow rate sensors 206 are capable of determining a mass flow rate or a volumetric flow rate of lubricant and can generate flow rate data indicative of a rate of lubricant capable of being sensed by the flow rate sensors 206. The flow rate sensors 206 can take a variety of forms, including, but not limited to, a turbine flow meter and an ultrasonic flow meter, to set forth just a few examples.

A lubricant flow controller 212 is used in the lubricant flow control system 200 to monitor operation of the engine 10 and any lubricant consumer associated with operation of the engine 10 and adjust a flow of lubricant to the lubricant consumer through use of the variable flow lubricant pump 202 and the flow rate sensors 206. The lubricant flow controller 212 can be integrated into an engine controller (e.g., a full authority digital engine controller (FADEC) or like device) or can stand alone and interface with the engine controller. The lubricant flow controller 212 can be configured to receive or determine a variable consumption demand of the lubricant consumer. For example, the lubricant flow controller 212 may receive a variable consumption demand from the engine controller based on operation of the engine 10. In some applications, small changes to a speed of the core engine 16 can translate to large changes in power flow through the gearbox assembly 100 which can result in large changes in demand for delivery of the lubricant. In such an application, the variable consumption demand from the engine controller may prompt large changes to at least one of the variable flow lubricant pump 202 or the lubricant flow control valve 208. In one non-limiting example of lubricant flow to the gearbox assembly 100, the lubricant flow can be used to lubricate and to cool the gears (e.g., the sun gear 102, the planet gears 104, and the ring gear 106) in the gearbox assembly 100 as well as bearings in the gearbox assembly 100. Lubricant flow to the gears can be 8.8 gallon per minute (33 liters per minute) at takeoff power, but only 6.4 gallons per minute (24.3 liters per minute) at ground idle. Lubricant flow to the bearings can be 1.9 gallons per minute (7.1 liters per minute) at takeoff power, but only 1.4 gallons per minute (5.2 liters per minute) at ground idle. The values of the lubricant flow provided here are exemplary only, and other flow rates of the lubricant can be used.

The lubricant flow controller 212 is configured to receive the flow rate data from the flow rate sensors 206 and generate a pump control command to control the variable flow lubricant pump 202. In some forms, the lubricant flow controller 212 can also receive information (e.g., data, commands, etc.) from the engine controller in those embodiments in which the lubricant flow controller 212 is not integrated into the engine controller. The lubricant flow controller 212 can be in wired communication or wireless communication with each of the flow rate sensors 206 and the variable flow lubricant pump 202. In some forms, a data bus can be used to transmit the pump control command or the flow rate data.

The lubricant flow controller 212 can also receive flow data generated from a flow data sensor 214 representative of a state of the lubricant, such as a temperature or a pressure of the lubricant. Although only a single flow data sensor 214 is provided, greater numbers of flow data sensors 214 can be used in the lubricant flow control system 200, and can be placed in any location throughout the lubricant flow control system 200. The flow data generated from the flow data sensor 214 can be used to confirm appropriate delivery of fluid to any given lubricant consumer associated with the flow data sensor 214 or change a rate of lubricant being delivered to the lubricant consumer on the basis of the flow data.

The lubricant flow controller 212 can, thus, generate the pump control command to provide a pump variable flow of lubricant 204 that, in the aggregate, will satisfy each of the lubricant consumers associated with operation of the engine 10. Additionally, the lubricant flow controller 212 can generate a valve command for the lubricant flow control valve 208 to provide a valve variable flow of lubricant 210 suitable for a lubricant consumer associated with the circuit branch related to the lubricant flow control valve 208. The pump variable flow of lubricant 204 will equal the summation of all circuit branches associated with a lubricant consumer, whether each of the circuit branches includes a lubricant flow control valve 208 or not. In those circuit branches that do not include the lubricant flow control valve 208, those particular circuit branches may be sized to receive a wide variety of rate of lubricant given the regulation of the pump variable flow of lubricant 204 and the valve variable flow of lubricant 210. Further to the above, and with particular respect to the flow data sensor 214, if a lubricant consumer, such as the electrical generator, requires cooling but a temperature of the lubricant measured by the flow data sensor 214 is high for the variable flow of lubricant 210 delivered from the lubricant flow control valve 208, then the lubricant flow controller 212 can increase the variable flow of lubricant 210 by increasing the flow rate of at least one of the valve variable flow of lubricant 210 provided from the lubricant flow control valve 208 or the pump variable flow of lubricant provided from the variable flow lubricant pump 202.

Figure 5:
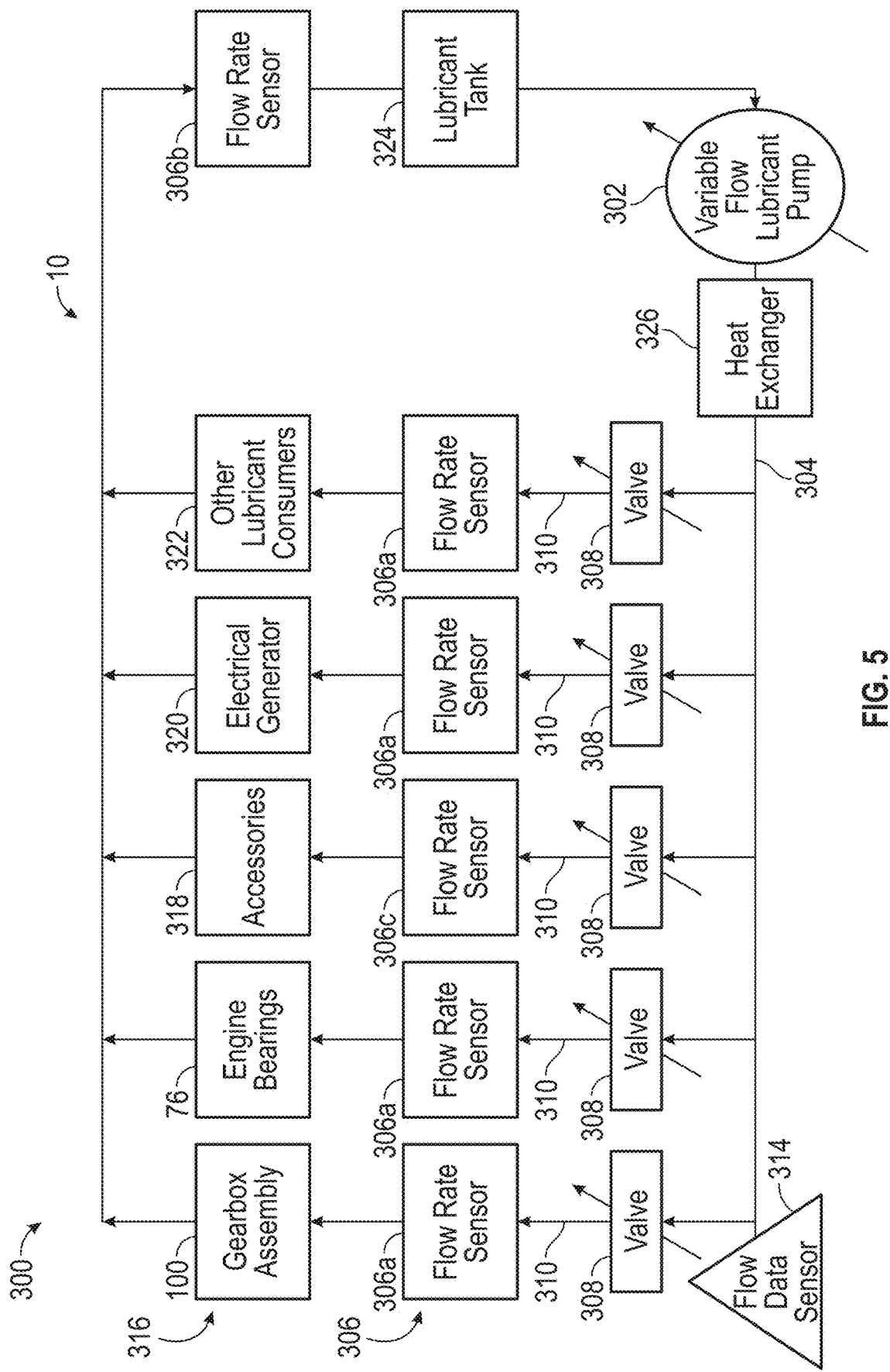
FIG. 5 is a schematic diagram of a lubricant flow control system, according to an embodiment of the present disclosure.

FIG. 5 is a schematic diagram of a lubricant flow control system 300, according to an embodiment of the present disclosure. Like reference numerals refer to like elements as between FIGS. 4 and 5. The lubricant flow control system 300 includes a variable flow lubricant pump 302 that provides a pump variable flow of lubricant 304, a plurality of flow rate sensors 306 including a first flow rate sensor 306a and a second flow rate sensor 306b, a plurality of lubricant flow control valves 308 that provides a valve variable flow of lubricant 310, a lubricant flow controller (not shown for clarity), and a flow data sensor 314.

FIG. 5 depicts a plurality of lubricant consumers 316. Example lubricant consumers 316 depicted in FIG. 5 include the gearbox assembly 100, the engine bearings 76, accessories 318, an electrical generator 320, and associated other lubricant consumers 322 (representing any number of other lubricant consumers). Each circuit branch leading to the respective lubricant consumers 316 has a respective flow rate sensor 306 (e.g., the first flow rate sensors 306a) and a respective lubricant flow control valve 308 associated therewith. Also, although the lubricant flow controller is not illustrated, the lubricant flow control valves 308, the flow rate sensors 306, and the flow data sensor 314 are in communication with the lubricant flow controller as in the embodiments described elsewhere herein. The illustration in FIG. 5, therefore, is a simplified view of a plurality of circuit branches where the presence of the lubricant flow controller is assumed as present but not illustrated. Also, as stated above, although each of the circuit branches leading to the lubricant consumers 316 is depicted as having both the lubricant flow control valves 308 and the flow rate sensors 306, some embodiments may lack one or both of the lubricant flow control valves 308 and the flow rate sensors 306 in any given circuit branch leading to the respective lubricant consumers 316.

The lubricant flow control system 300 can include a lubricant tank 324 positioned in a return branch to the variable flow lubricant pump 302, as well as a heat exchanger 326 in communication with an outflow of the variable flow lubricant pump 302 and before splitting to the various circuit branches. The lubricant tank 324 can be used to provide a reservoir from which the variable flow lubricant pump 302 draws a source of lubricant. The lubricant tank 324 can also act as a buffer given the incompressible nature of lubricant and the need to vary the rate of lubricant provided throughout the lubricant flow control system 300. Not all embodiments of the lubricant flow control system 300, however, include the lubricant tank 324. In similar fashion, not all embodiments of the lubricant flow control system 300 include the heat exchanger 326. In those embodiments that do include the heat exchanger 326, such as that depicted in FIG. 5, use the heat exchanger 326 to alter a temperature of the pump variable flow of lubricant 304. In some forms, the heat exchanger 326 can be an on-demand heat exchanger capable of providing cooling or heating to the lubricant flowing through the heat exchanger 326. In other forms, however, the heat exchanger 326 is captive to the nature of its design (providing only cooling or only heating to the lubricant). The heat exchanger 326 can be an air-to-lubricant heat exchanger, or a fuel-to-lubricant heat exchanger to suit the needs of any given application. Although not depicted, the lubricant flow control system 200 shown in FIG. 4 can include a lubricant tank or a heat exchanger.

Figure 6:
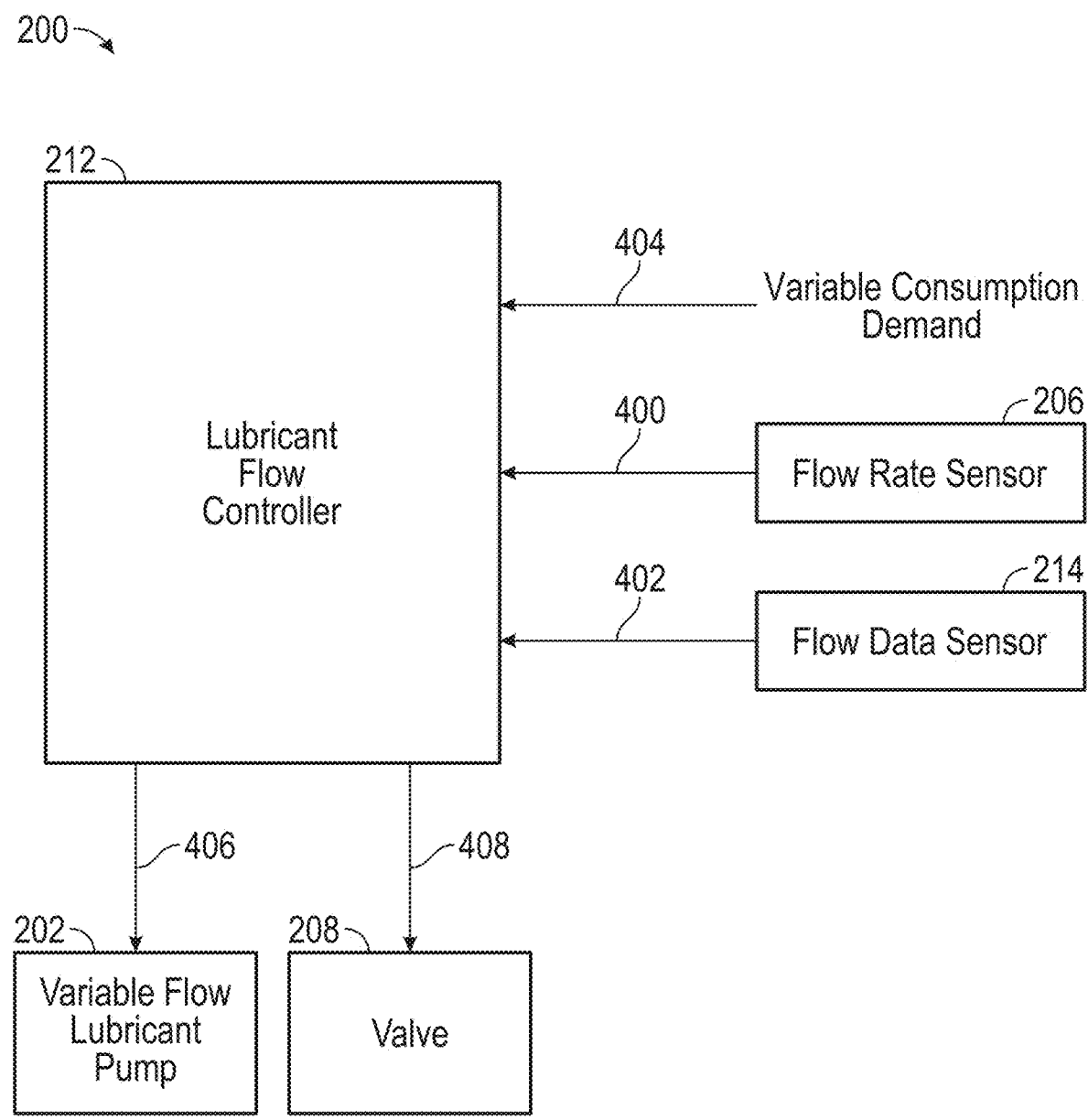
FIG. 6 is a schematic diagram of a lubricant flow controller, according to an embodiment of the present disclosure.

FIG. 6 is a schematic diagram of the lubricant flow controller 212 of the lubricant flow control system 200, according to an embodiment of the present disclosure. The description of the lubricant flow controller 212 in FIG. 6 is also applicable to the lubricant flow control system 300 shown in FIG. 5. As shown in FIG. 6, the lubricant flow controller 212 is in communication with the flow rate sensor 206 and flow data sensor 214, each transmitting, respectively, flow rate data 400 and flow data 402. The lubricant flow controller 212 is also shown as receiving a variable consumption demand 404 which can originate from another controller, such as an engine controller. Alternatively, the lubricant flow controller 212 can receive operational data, in lieu of the variable consumption demand 404, and determine, within the lubricant flow controller 212, the variable consumption demand 404. For example, another device may send operational details related to operation of a lubricant consumer which the lubricant flow controller 212 uses to determine the variable consumption demand 404. The determination of the variable consumption demand 404 can be through any suitable algorithm, look-up table, or model, to set forth just a few non-limiting embodiments. The lubricant flow controller 212 can use the variable consumption demand 404, whether provided to the lubricant flow controller 212 or determined within the lubricant flow controller 212, in conjunction with the flow rate data 400, and in some embodiments the flow data 402, to determine a pump control command 406 and a valve command 408. The lubricant flow controller 212, as suggested above, can determine an aggregate variable consumption demand 404, such as through summation of the variable consumption demand 404 of each lubricant consumer, to determine the pump control command 406. For example, if the lubricant flow controller 212 determines the gearbox assembly 100 and the engine bearings 76 require lubrication, but that accessories and the electrical generator do not require lubrication, the lubricant flow controller 212 can add the variable consumption demand 404 from each of the gearbox assembly 100 and the engine bearings 76 together to form an aggregate variable consumption demand 404. At another point in time, if the lubricant flow controller 212 determines that the electrical generator requires lubricant for cooling at the same time as the gearbox assembly 100 and the engine bearings 76, then the lubricant flow controller 212 can add the variable consumption demand from each of the gearbox assembly 100, the engine bearings 76, and the electrical generator to form an aggregate variable consumption demand 404. In this way, in some embodiments, the aggregate variable consumption demand 404 can be a time varying determination that represents a varying demand from varying numbers of lubricant consumers. The variable consumption demand 404 for any given lubricant consumer can be a variable amount between a minimum flow (e.g., valve closed to produce a no flow condition) and a maximum flow (e.g., valve full open to produce a maximum flow condition). In some embodiments, the variable consumption demand 404 may be an intermediate value between the minimum flow and maximum flow.

Additionally, or alternatively, the lubricant flow controller 212 can also determine the individual valve commands 408 for each of the separate lubricant flow control valves (e.g., the lubricant flow control valves 308) to provide the appropriate flow of lubricant to meet lubrication requirements or thermal requirements of the lubricant consumers. In some embodiments, the lubricant flow control valve 208 associated with each of the lubricant consumers can be commanded to be either open or closed, for example, in those embodiments which include either full flow or no flow of lubricant. In still further embodiments, the lubricant flow control valve 208 associated with each lubricant consumer can provide an intermediate valve position between a fully open position and a fully closed position. Any number of intermediate valve positions can be provided. In some forms the valve command 408 issued by the lubricant flow controller 212 can be continuously variable, while in others the valve command 408 is a command having quantized values (e.g., a digital command within the lubricant flow controller 212 that is converted to analog output for driving the lubricant flow control valve 208). To set forth just one example, a valve command 408 to the lubricant flow control valve 208 associated with the gearbox assembly 100 can be issued by the lubricant flow controller 212 to provide partial flow of lubricant to the gearbox assembly 100 while at the same time that a discrete valve open command is provided by the lubricant flow controller 212 to the lubricant flow control valve 208 associated with an accessory to provide either a fully open position or a fully closed position. In some forms, each lubricant flow control valve 208 associated with the respective lubricant consumers can be different from one another, with, for example, the lubricant flow control valve 208 associated with the accessory providing either the fully open position or the fully closed position, while the lubricant flow control valve 208 associated with the gearbox assembly 100 providing at least one intermediate position between the fully open position and the fully closed position.

In one mode of operation, the lubricant flow controller 212 can provide a minimum pressure to each of the lubricant consumers, and if sufficient capacity remains in the variable flow lubricant pump 202, additional flow of lubricant can be commanded via the pump control command 406 to generate additional flow for thermal cooling purposes. For example, if the variable flow lubricant pump 202 has a maximum flow capacity at a given flow rate, and if one or more lubricant consumers demand a minimum pressure for lubrication purposes while one or more other lubricant consumers demand lubricant for cooling purposes, the lubricant flow controller 212 can prioritize the allocation of lubricant via commands to the lubricant flow control valves 208 associated with each consumer for lubrication purposes, and thereafter allocate remaining flow capacity (e.g., subtract the capacity associated with the lubricant consumers requesting for lubrication purposes from the maximum flow capacity) for cooling purposes to the other lubricant consumers requesting for cooling purposes. If insufficient capacity remains to provide thermal cooling purposes, the lubricant flow controller 212 can either deny the request for thermal cooling purposes, or, if in the example of a variable lubricant flow control valve 208, issue a partial valve command 408 to partially provide a flow of lubricant for thermal cooling purposes.

Additionally, or alternatively, the lubricant flow controller 212 can provide either open loop commands (e.g., no feedback or other estimation to provide dynamic regulation of the lubricant flow rate) to one or both of the variable flow lubricant pump 202 and the lubricant flow control valve 208, or can provide closed loop commands (e.g., feedback or estimation used to provide dynamic regulation of the lubricant flow rate). For example, the lubricant flow controller 212 can determine a flow rate of lubricant delivered from the lubricant flow control valve 208 and compare it to a desired flow rate of lubricant determined based on the variable consumption demand 404. In some embodiments, the flow rate sensor 206 or the flow data sensor 214 (e.g., a pressure sensor) can be used either directly to provide feedback of the amount of lubricant delivered or can be used to calculate a flow rate of the amount of lubricant delivered. The lubricant flow controller 212 can close the loop using any of a number of potential variables, including flow rate, flow pressure, or lubricant demand. For example, if the lubricant flow controller 212 closes the loop based on lubricant demand, the lubricant flow controller 212 can include control functionality to convert measured lubricant pressure to an actual flow rate and convert the variable consumption demand 404 from any given lubricant consumer to a desired flow rate. If the flow rate from the lubricant flow control valve 208 is in error (e.g., a difference between the desired flow rate and the actual flow rate provided from the lubricant flow control valve 208), the lubricant flow controller 212 can command the lubricant flow control valve 208 to open or to close depending upon the error.

Figure 7:
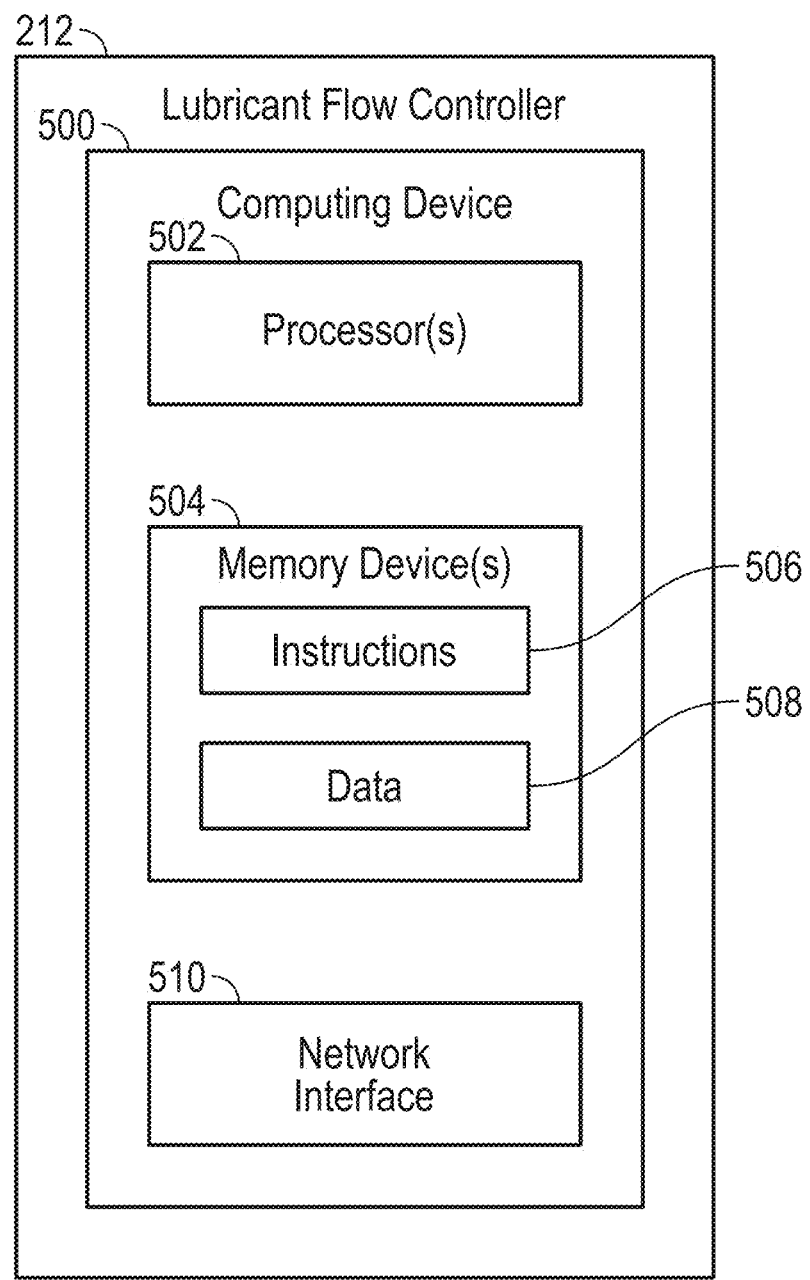
FIG. 7 is a schematic diagram of the lubricant flow controller implemented as a computing device, according to an embodiment of the present disclosure.

FIG. 7 is a schematic diagram of the lubricant flow controller 212 implemented as a computing device 500, according to an embodiment of the present disclosure. In particular, one or more portions of the lubricant flow controller 212 can be implemented using the computing device 500. The computing device 500 can include one or more processors 502 and one or more memory devices 504. The one or more processors 502 can include any suitable processing device, such as a microprocessor, a microcontroller, an integrated circuit, a logic device, or other suitable processing device. The one or more memory devices 504 can include one or more computer-readable media, including, but not limited to, non-transitory computer-readable media, random access memory (RAM), read-only memory (ROM), hard drives, flash drives, or other memory devices.

The one or more memory devices 504 can store information accessible by the one or more processors 502, including computer-readable instructions 506 that can be executed by the one or more processors 502. The instructions 506 can be any set of instructions that when executed by the one or more processors 502, cause the one or more processors 502 to perform operations. In some embodiments, the instructions 506 can be executed by the one or more processors 502 to cause the one or more processors 502 to perform operations, such as any of the operations and the functions for which the lubricant flow controller 212 or the computing device 500 are configured, the operations for any of the aforementioned systems such as the variable flow lubricant pump 202, the lubricant flow control valve 208, etc., as described herein, or any other operations or functions of the computing device 500 (e.g., as a FADEC). The instructions 506 can be software written in any suitable programming language or can be implemented in hardware. Additionally, or alternatively, the instructions 506 can be executed in logically, or virtually, separate threads on the one or more processors 502. The one or more memory devices 504 can further store data 508 that can be accessed by the one or more processors 502. For example, the data 508 can include data indicative of outside air conditions, power flows, data indicative of engine/aircraft operating conditions, or any other data or information described herein.

The computing device 500 can also include a network interface 510 used to communicate, for example, with the other components of the systems described herein (e.g., via a communication network). The network interface 510 can include any suitable components for interfacing with one or more networks, including for example, transmitters, receivers, ports, controllers, antennas, or other suitable components. One or more devices can be configured to receive one or more commands from the computing device 500 or to provide one or more commands to the computing device 500.

The technology discussed herein makes reference to computer-based systems and actions taken by, and information sent to, and from, computer-based systems. One of ordinary skill in the art will recognize that the inherent flexibility of computer-based systems allows for a great variety of possible configurations, combinations, and divisions of tasks and functionality between, and among, components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Referring back to FIG. 3, as the volume of the gearbox 101 increases, the diameter of the gearbox DGB, increases. As the power output of the gearbox 101 increases the amount of heat generated increases. The increase in heat generation increases the volume of lubricant required to operate the gearbox, which calls for an increased gutter volume $V_G$ for capture and recirculation of lubricant through the scavenging system. However, it is also desired to reduce the overall footprint of the gearbox, lubricant and scavenge system given an emphasis on decreasing packaging space available for the gearbox and lubricant scavenge system, especially for engines with power gearboxes operating with relatively high gear ratios, e.g., between, inclusive of the endpoints, 2.5 to 3.5, 3.0, 3.25, 4.0, and above gear ratios (GRs).

In view of the foregoing, it is desirable to improve, or at least maintain, a target efficiency of a gearbox without oversizing a gutter or scavenge system, or while reducing its size to accommodate only what is needed or can be accommodated in terms of weight increase or volume. When developing a gas turbine engine, the interplay among components can make it particularly difficult to select or to develop one component (e.g., the gutter 114) during engine design and prototype testing, especially, when some components are at different stages of completion. For example, one or more components may be nearly complete, yet one or more other components may be in an initial or preliminary phase. It is desired to arrive at what is possible at an early stage of design, so that the down selection of candidate optimal designs, given the tradeoffs, become more possible. Heretofore, the process has sometimes been more ad hoc, selecting one design or another without knowing the impact when a concept is first taken into consideration. For example, various aspects of the fan section 14 design, compressor section 22 design, combustion section 28, or turbine section 30 design, may not be known at the time of design of the gutter, but such components impact the size of the gearbox 101 required and the amount of lubricant required, and thus, the design of the gutter 114.

The inventors desire to arrive at a more favorable balance between maximizing gearbox scavenge flow collection while minimizing other, potential negative effects on an improperly chosen gutter size had previously involved, e.g., the undertaking of multivariate trade studies, which may or may not have yielded an improved, or best match gutter/scavenge for a particular architecture. Unexpectedly, it was discovered that a relationship exists between the volume of the gutter and gearbox volume that uniquely identified a finite and readily ascertainable (in view of this disclosure) number of embodiments suited for a particular architecture, which improves the weight-volume-scavenge effectiveness tradeoffs for a particular architecture. This relationship the inventors refer to as the Lubricant Extraction Volume Ratio (LEVR):

$$LEVR = \frac{V_G}{V_{GB}} \quad (1)$$

$V_G$ represents the gutter volume, as identified with respect to FIGS. 2 and 3. The gutter volume may be determined by calculating the volume within a cross section of the gutter. $V_{GB}$ represents the gearbox volume, which is defined below (2). For engine power between eighteen kHP and thirty-five kHP, inclusive of the endpoints, the gearbox volume $V_{GB}$ is between eight hundred in$^3$ and two thousand in$^3$, inclusive of the endpoints. In some examples, the engine is a turbofan engine. The inventors found that the gutter volume $V_G$ should be selected based on the range 0.01≤LEVR≤to 0.3 (gutter volume is between 1 percent and 30 percent the gearbox volume, inclusive of the endpoints).

$$V_{GB} = L_{GB} * \pi * \left(\frac{D_{GB}}{2}\right)^2 \quad (2)$$

LGB represents the gearbox length, as identified with respect to FIG. 2. Although described with respect to gears of the same length in FIG. 2, the gearbox length may be defined by any of the sun gear 102, a planet gear 104, or the ring gear 106, instances when the aforementioned gears are of different lengths. In (2), DGB represents the gearbox diameter, as identified with respect to FIG. 3.

Figure 8:
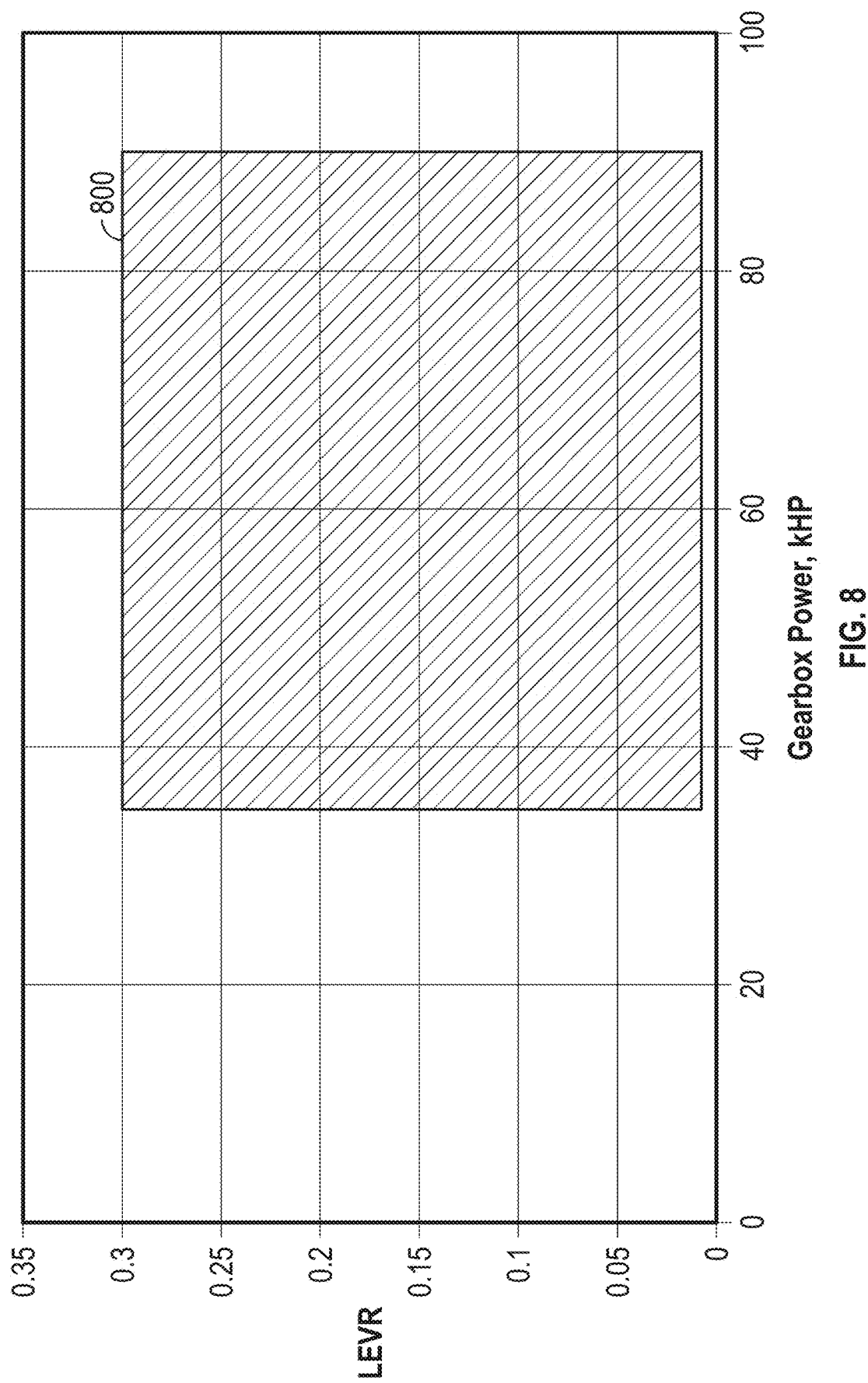
FIG. 8 illustrates a graph showing the lubricant extraction volume ratio as a function of gearbox power, according to an embodiment of the present disclosure.
Figure 9:
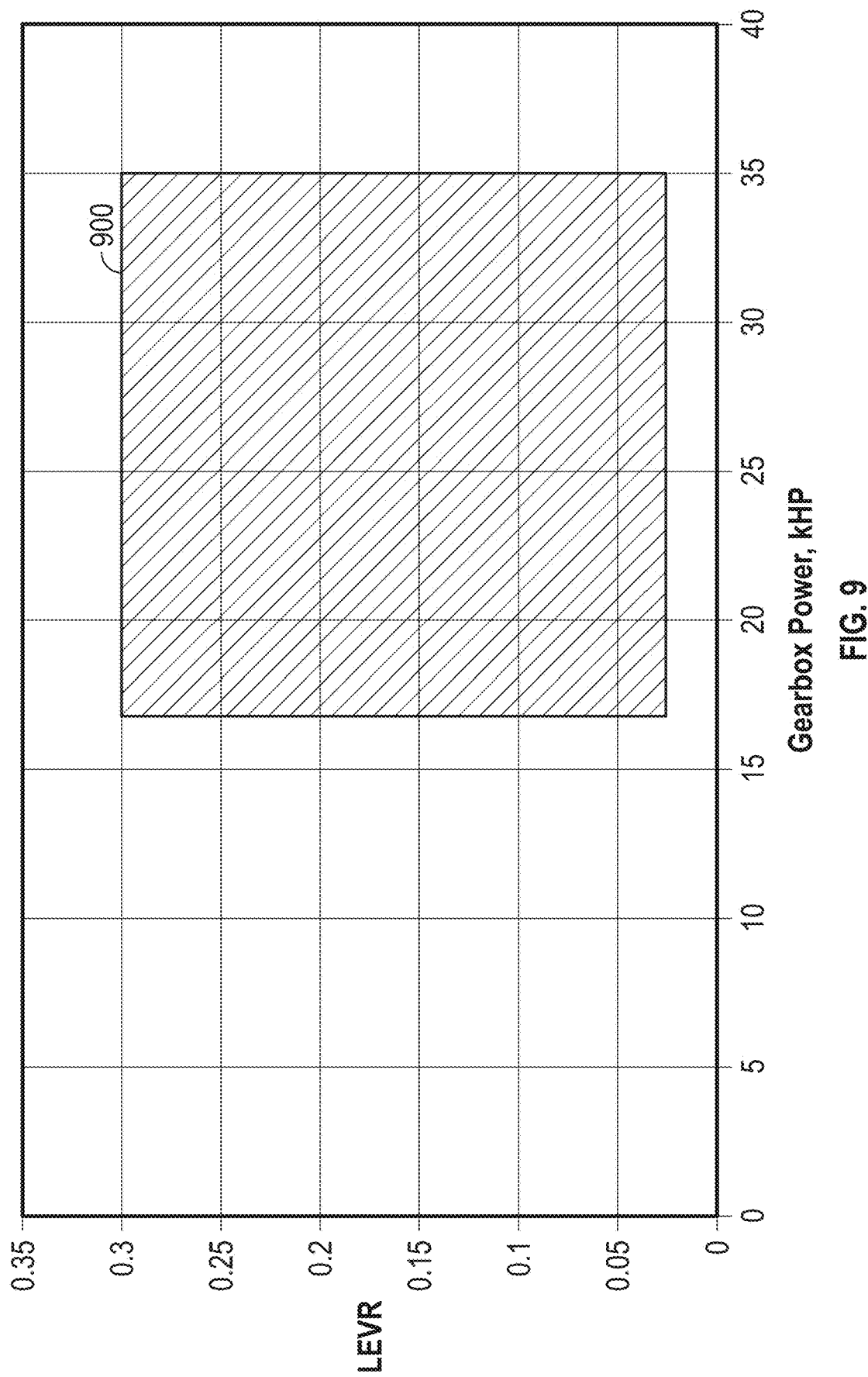
FIG. 9 illustrates a graph showing the lubricant extraction volume ratio as a function of gearbox power, according to an embodiment of the present disclosure.

In some embodiments, and as shown in a region 800 in FIG. 8, LEVR is between 0.01 and 0.3, inclusive of the endpoints, for maximum gearbox power of between thirty-five kHP and ninety kHP, inclusive of the endpoints. In some embodiments, and as shown in a region 900 in FIG. 9, LEVR is between 0.03 and 0.3, inclusive of the endpoints, for a maximum gearbox power of less than or equal to thirty-five kHP.

If the gutter volume relative to the gearbox volume is such that the LEVR upper limit is exceeded (e.g., a "large gutter"), there is too large of a volume within the gutter than is needed to recover gearbox lubricant scavenge, which can lead to increased lubricant churning loss and lubricant foaming in the gutter, leading to increased power loss in the overall gearbox assembly. The foaming in the gutter can generate drag in the gutter and negatively impact gearbox performance, and ultimately, engine performance. Furthermore, a large gutter requires more radial space and the increased material, mass, and size, etc., of the large gutter encroaches upon other system components within the engine (e.g., the core flow path), which, again, negatively impacts gearbox performance. The LEVR is selected to balance recovery of gearbox lubricant scavenge and impact to the engine operation and efficiency.

If the gutter volume relative to the gearbox volume is such that the LEVR lower limit is violated (e.g., a "small gutter"), there is too small of a volume within the gutter than is needed to recover the gearbox lubricant scavenge. The gutter will not fully capture the gearbox lubricant scavenge (e.g., flow $F_2$), leading to inadequate removal of the lubricant from the gearbox sump. This can lead to leakage of the scavenge lubricant back into the gearbox or to other areas of the engine, negatively impacting the performance of both the gearbox and the engine. The lower limit of the LEVR is selected to balance recovery of gearbox lubricant scavenge and impact to the gearbox and engine operation and efficiency (e.g., volume & weight penalty).

Taking into consideration the above considerations for selecting upper and lower limits, the LEVR may also be defined in terms of a Power Factor, Flow Transition Time and a Heat Density Parameter:

$$LEVR = PF * \frac{FT}{HDP} \quad (3)$$

where PF represents the Power Factor, FT represents the Flow Transition Time, and HDP represents the Heat Density parameter. The Power Factor PF is defined in (4):

$$PF = PD * (1 - \eta) \quad (4)$$

where PD represents the gearbox power density and η represents the gearbox efficiency. The power density PD is a ratio of the power of the gearbox to the volume of the gearbox and is between fifteen thousand hp/ft$^3$ and forty-five thousand hp/ft³, inclusive of the endpoints. The gearbox efficiency is between 99.2 percent and 99.8 percent, inclusive of the endpoints.

The Flow Transition Time FT is given by:

$$FT = \frac{V_G}{V_{dot}} \quad (5)$$

where $V_G$ represents the gutter volume, as identified with respect to FIGS. 2 and 3. Vdot represents the lubricant volumetric flow rate. The lubricant volumetric flow rate is defined by the gearbox power and the efficiency. Since the inefficiency of the gearbox generates heat, a certain quantity of lubricant is required to remove the heat. The Flow Transition Time is the time it takes the lubricant to traverse the entire gutter volume. The Flow Transition Time indirectly links the gutter volume to the gearbox volume. The Flow Transition Time is between 1.5 and eleven seconds, inclusive of the endpoints.

The Heat Density parameter HDP is defined as:

$$HDP = \rho * C * \Delta T \quad (6)$$

where $\rho$ represents the fluid density, C represents the lubricant specific heat, and $\Delta T$ represents the temperature rise in the lubricant, which, is between twenty degrees Celsius and forty-five degrees Celsius, inclusive of the endpoints.

Table 1 describes exemplary embodiments 1 and 2 identifying the LEVR for various engines. The embodiments 1 and 2 are for narrow body, turbofan engines. The LEVR of the present disclosure is not limited to such engines, however, and may be applicable over a wide range of thrust class and engine designs, including, for example, wide body engines. In some examples, the engine may include, but is not limited to, business jet propulsion engines, small turbofan engines, open rotor engines, marine and industrial turbine engines, including portable power generation units, and marine propulsion for ships.

TABLE 1

| Embodiments | Power (kHP) | $V_G$ (in^3) | $V_{GB}$ (in^3) | LEVR |
|---|---|---|---|---|
| 1 | 20-30 | 253 | 5601 | .045 |
| 2 | 17 | 37 | 691 | .054 |

As the gearbox power, and, thus, the gearbox size/volume increases, the gutter volume also must increase to ensure proper function of the gutter. However, the relationship between LEVR and gearbox (fan) power is not linear. Furthermore, different gearbox configurations like planetary and differential could require more lubricant flow due to the lower efficiency compared to a star gearbox configuration. Therefore, these higher power gearboxes with different operating configurations could yield LEVR nearing 0.3. Accordingly, for star gearbox configurations, Table 1 shows this relationship.

Accordingly, the gutter volume is critical to minimizing the lubricant scavenge losses as the lubricant exits the gearbox and is redirected to the scavenge port of the gutter.

Therefore, the present disclosure defines a lubricant extraction volume ratio that improves or maintains gearbox efficiency, while ensuring the gutter provided with the gearbox is not oversized or undersized with respect to the needs of the gearbox. By maintaining the gutter within the range defined by the lubricant extraction volume ratio, scavenge flow collection is maximized and the negative effects of the gutter (e.g., added weight and size to the system) that may contribute to a reduction in gearbox efficiency are minimized.

Further aspects of the present disclosure are provided by the subject matter of the following clauses.

According to an aspect of the present disclosure, a gearbox assembly comprises a gearbox and a gutter. The gutter is for collecting a gearbox lubricant scavenge flow from the gearbox, the gutter being characterized by a lubricant extraction volume ratio between 0.01 and 0.3, inclusive of the endpoints.

The gearbox assembly of the preceding clause, wherein the lubricant extraction volume ratio is between 0.03 and 0.3, inclusive of the endpoints, for a gearbox power less than or equal to thirty-five kHP.

The gearbox assembly of any preceding clause, wherein the lubricant extraction volume ratio is defined by a ratio of a gutter volume of the gutter to a gearbox volume of the gearbox.

The gearbox assembly of any preceding clause, wherein the gutter volume is defined by an inner surface of a gutter wall of the gutter.

The gearbox assembly of any preceding clause, wherein the gearbox volume is defined by an outer diameter of the gearbox and a gearbox length of the gearbox.

The gearbox assembly of any preceding clause, wherein the outer diameter of the gearbox is an outer diameter of a ring gear.

The gearbox assembly of any preceding clause, wherein the gearbox length is defined between a forwardmost end of a gear of the gearbox and an aftmost end of the gear.

The gearbox assembly of any preceding clause, wherein the gearbox includes a sun gear, a plurality of planet gears, and a ring gear.

The gearbox assembly of any preceding clause, wherein the lubricant extraction volume ratio is defined by a ratio of a gutter volume of the gutter to a gearbox volume of the gearbox.

The gearbox assembly of any preceding clause, wherein the gearbox volume is defined by an outer diameter of the ring gear and a length of the gearbox.

The gearbox assembly of any preceding clause, wherein the lubricant extraction volume ratio is defined by a power factor, a flow transition time, and a heat density parameter.

The gearbox assembly of any preceding clause, wherein the flow transition time is defined by a gutter volume of the gutter and a lubricant volumetric flow rate of a lubricant through the gearbox.

The gearbox assembly of any preceding clause, wherein the flow transition time is between 1.5 seconds and eleven seconds, inclusive of the endpoints.

The gearbox assembly of any preceding clause, wherein the power factor is defined by a power density of the gearbox and an efficiency of the gearbox.

The gearbox assembly of any preceding clause, wherein the power density is between fifteen thousand hp/ft³ and forty-five thousand hp/ft³, inclusive of the endpoints, and the efficiency is between 99.2 percent and 99.8 percent, inclusive of the endpoints.

The gearbox assembly of any preceding clause, wherein the gearbox includes a sun gear, a plurality of planet gears, and a ring gear, and wherein the gutter circumscribes the ring gear.

The gearbox assembly of any preceding clause, wherein the gutter wholly circumscribes the ring gear.

The gearbox assembly of any preceding clause, wherein the gutter partially circumscribes the ring gear.

The gearbox assembly of any preceding clause, wherein the gutter is located radially outward of the gearbox.

The gearbox assembly of any preceding clause, wherein the gutter further comprises a scavenge port located near a bottom of the gutter.

The gearbox assembly of any preceding clause, wherein the gearbox is a star configuration.

The gearbox assembly of any preceding clause, wherein the gearbox is a planetary configuration.

The gearbox assembly of any preceding clause, wherein the gearbox is a differential gearbox.

The gearbox assembly of any preceding clause, wherein the gearbox volume is between eight hundred in$^3$ and two thousand in$^3$, inclusive of the endpoints, when the engine power is between eighteen kHP and thirty-five kHP, inclusive of the endpoints.

The gearbox assembly of any preceding clause, wherein the gutter volume is between 0.01 and 0.3 times, inclusive of the endpoints, the gearbox volume.

According to an aspect of the present disclosure, a gas turbine engine comprises a gearbox assembly comprising a gearbox and a gutter. The gutter is for collecting a gearbox lubricant scavenge flow from the gearbox, the gutter being characterized by a lubricant extraction volume ratio between 0.01 and 0.3, inclusive of the endpoints.

The gas turbine engine of the preceding clause, wherein the lubricant extraction volume ratio is between 0.01 and 0.3, inclusive of the endpoints, when the gas turbine engine has an engine power greater than or equal to thirty-five kHP.

The gas turbine engine of any preceding clause, wherein the engine power is between thirty-five kHP and ninety kHP, inclusive of the endpoints.

The gas turbine engine of any preceding clause, wherein the lubricant extraction volume ratio is between 0.03 and 0.3, inclusive of the endpoints.

The gas turbine engine of any preceding clause, wherein the lubricant extraction volume ratio is between 0.03 and 0.3, inclusive of the endpoints, when the gas turbine engine has an engine power less than or equal to thirty-five kHP.

The gas turbine engine of any preceding clause, wherein the lubricant extraction volume ratio is defined by a ratio of a gutter volume of the gutter to a gearbox volume of the gearbox.

The gas turbine engine of any preceding clause, wherein the gutter volume is defined by an inner surface of a gutter wall of the gutter.

The gas turbine engine of any preceding clause, wherein the gearbox volume is defined by an outer diameter of the gearbox and a gearbox length of the gearbox.

The gas turbine engine of any preceding clause, wherein the outer diameter of the gearbox is an outer diameter of a ring gear.

The gas turbine engine of any preceding clause, wherein the gearbox length is defined between a forwardmost end of a gear of the gearbox and an aftmost end of the gear.

The gas turbine engine of any preceding clause, wherein the gearbox includes a sun gear, a plurality of planet gears, and a ring gear.

The gas turbine engine of any preceding clause, wherein the lubricant extraction volume ratio is defined by a ratio of a gutter volume of the gutter to a gearbox volume of the gearbox.

The gas turbine engine of any preceding clause, wherein the gearbox volume is defined by an outer diameter of the ring gear and a length of the gearbox.

The gas turbine engine of any preceding clause, wherein the lubricant extraction volume ratio is defined by a power factor, a flow transition time, and a heat density parameter.

The gas turbine engine of any preceding clause, wherein the power factor is defined by a power density of the gearbox and an efficiency of the gearbox.

The gas turbine engine of any preceding clause, wherein the power density is between fifteen thousand hp/ft$^3$ and forty-five thousand hp/ft$^3$, inclusive of the endpoints, and the efficiency is between 99.2 percent and 99.8 percent, inclusive of the endpoints.

The gas turbine engine of any preceding clause, wherein the flow transition time is defined by a gutter volume of the gutter and a lubricant volumetric flow rate of a lubricant through the gearbox.

The gas turbine engine of any preceding clause, wherein the flow transition time is between 1.5 seconds and eleven seconds, inclusive of the endpoints.

The gas turbine engine of any preceding clause, wherein the gearbox includes a sun gear, a plurality of planet gears, and a ring gear, and wherein the gutter circumscribes the ring gear.

The gas turbine engine of any preceding clause, wherein the gutter wholly circumscribes the ring gear.

The gas turbine engine of any preceding clause, wherein the gutter partially circumscribes the ring gear.

The gas turbine engine of any preceding clause, wherein the gutter is located radially outward of the gearbox.

The gas turbine engine of any preceding clause, wherein the gutter further comprises a scavenge port located near a bottom of the gutter.

The gas turbine engine of any preceding clause, wherein the gearbox is a star configuration.

The gas turbine engine of any preceding clause, wherein the gearbox is a planetary configuration.

The gas turbine engine of any preceding clause, wherein the gearbox is a differential gearbox.

The gas turbine engine of any preceding clause, wherein the gearbox volume is between eight hundred in$^3$ and two thousand in$^3$, inclusive of the endpoints, when the engine power is between eighteen kHP and thirty-five kHP, inclusive of the endpoints.

The gas turbine engine of any preceding clause, wherein the gutter volume is between 0.01 and 0.3 times, inclusive of the endpoints, the gearbox volume.

A gas turbine engine including a gearbox assembly including a gearbox having a gearbox volume defined by an outer diameter of the gearbox and a gearbox length of the gearbox, and a gutter for collecting a gearbox lubricant scavenge flow from the gearbox, the gutter having a gutter volume defined by an inner surface of a gutter wall of the gutter and being characterized by a lubricant extraction volume ratio between 0.01 and 0.3, inclusive of the $$\frac{V_G}{V_{GB}},$$

endpoints, the lubricant extraction volume ratio defined by: wherein $V_G$ is the gutter volume of the gutter and $V_{GB}$ is the gearbox volume, and a lubricant flow control system including a variable flow lubricant pump that generates a pump variable flow of lubricant to the gearbox assembly during operation of the gas turbine engine, the gearbox assembly having a variable consumption demand for delivery of lubricant, and a lubricant flow controller configured to generate a pump control command for the variable flow lubricant pump to produce the pump variable flow of lubricant based on the variable consumption demand of the gearbox assembly.

The gas turbine engine of the preceding clause, wherein the lubricant flow control system includes a lubricant tank in fluid communication with the variable flow lubricant pump and a heat exchanger in fluid communication with the variable flow lubricant pump.

The gas turbine engine of the preceding clause, wherein the heat exchanger is in downstream fluid communication with the variable flow lubricant pump and upstream fluid communication with the gearbox assembly.

The gas turbine engine of any preceding clause, wherein the lubricant flow control system includes a lubricant flow control valve in fluid communication with the variable flow lubricant pump, the lubricant flow control valve configured to change the pump variable flow of lubricant to a valve variable flow of lubricant through operation of the lubricant flow control valve, and the gearbox assembly is configured to receive the valve variable flow of lubricant.

The gas turbine engine of the preceding clause, wherein the lubricant flow controller is configured to generate a valve command for the lubricant flow control valve based on the variable consumption demand of the gearbox assembly.

The gas turbine engine of the preceding clause, wherein the lubricant flow control system includes a flow rate sensor in fluid communication with the gearbox assembly, the flow rate sensor configured to generate flow rate data indicative of the valve variable flow of lubricant to the gearbox assembly.

The gas turbine engine of any preceding clause, wherein the lubricant flow control system includes a plurality of lubricant consumers including the gearbox assembly.

The gas turbine engine of the preceding clause, wherein each of the plurality of lubricant consumers including a variable consumption demand, and during operation of the plurality of lubricant consumers, the lubricant flow controller determines the pump control command based on an aggregate of the variable consumption demand of the plurality of lubricant consumers.

The gas turbine engine of any preceding clause, wherein the plurality of lubricant consumers is arranged in a parallel lubricant flow arrangement with each other.

The gas turbine engine of any preceding clause, wherein the plurality of lubricant consumers includes at least one of an engine bearing, an accessory, or an electrical generator.

The gas turbine engine of any preceding clause, wherein the lubricant flow control system includes a first flow rate sensor in fluid communication with the gearbox assembly, the first flow rate sensor configured to generate first flow rate data indicative of a rate of lubricant to the gearbox assembly.

The gas turbine engine of the preceding clause, wherein the lubricant flow controller is configured to generate the pump control command for the variable flow lubricant pump based on the first flow rate data from the first flow rate sensor.

The gas turbine engine of any preceding clause, wherein the lubricant flow control system includes a second flow rate sensor positioned downstream of the gearbox assembly configured to generate second flow rate data indicative of a rate of lubricant from the gearbox assembly.

The gas turbine engine of the preceding clause, wherein the lubricant flow controller is configured to generate the pump control command for the variable flow lubricant pump based on the second flow rate data from the second flow rate sensor.

A gas turbine engine including a gearbox assembly including a gearbox having a gearbox volume defined by an outer diameter of the gearbox and a gearbox length of the gearbox, and a gutter for collecting a gearbox lubricant scavenge flow from the gearbox, the gutter having a gutter volume defined by an inner surface of a gutter wall of the gutter and being characterized by a lubricant extraction volume ratio between 0.01 and 0.3, inclusive of the $$\frac{V_G}{V_{GB}},$$

endpoints, the lubricant extraction volume ratio defined by wherein $V_G$ is the gutter volume of the gutter and $V_{GB}$ is the gearbox volume, and a lubricant flow control system including a variable flow lubricant pump that generates a pump variable flow of lubricant during operation of the gas turbine engine, a lubricant flow control valve in fluid communication with the variable flow lubricant pump, the lubricant flow control valve configured to change the pump variable flow of lubricant to a valve variable flow of lubricant through operation of the lubricant flow control valve, wherein the gearbox assembly is configured to receive the valve variable flow of lubricant, the gearbox assembly having a variable consumption demand for delivery of the lubricant, and a lubricant flow controller configured to generate a valve control command for the lubricant flow control valve based on the variable consumption demand of the gearbox assembly.

The gas turbine engine of the preceding clause, wherein the lubricant flow control system includes a flow rate sensor in fluid communication with the gearbox assembly, the flow rate sensor configured to generate flow rate data indicative of the valve variable flow of lubricant to the gearbox assembly.

The gas turbine engine of the preceding clause, wherein the lubricant flow controller is configured to generate a pump control command for the variable flow lubricant pump to produce the pump variable flow of lubricant based on the flow rate data from the flow rate sensor.

The gas turbine engine of the preceding clause, wherein the lubricant flow control system includes a plurality of lubricant consumers including the gearbox assembly, each of the plurality of lubricant consumers including a variable consumption demand, and during operation of the plurality of lubricant consumers, the lubricant flow controller determines the pump control command based on an aggregate of the variable consumption demand of the plurality of lubricant consumers.

The gas turbine engine of the preceding clause, wherein the flow rate sensor is a first flow rate sensor, and the lubricant flow control system includes a second flow rate sensor positioned downstream of the gearbox assembly configured to generate second flow rate data indicative of a rate of lubricant from the gearbox assembly.

The gas turbine engine of the preceding clause, wherein the lubricant flow controller is configured to generate the pump control command for the variable flow lubricant pump based on the second flow rate data from the second flow rate sensor.

Although the foregoing description is directed to the preferred embodiments, other variations and modifications will be apparent to those skilled in the art, and may be made without departing from the disclosure. Moreover, features described in connection with one embodiment may be used in conjunction with other embodiments, even if not explicitly stated above.

The invention claimed is:

1. A gas turbine engine comprising:
a fan having a fan shaft;
a turbo-engine including a compressor section, a combustion section, and a turbine section, the turbine section having a low-pressure shaft drivingly coupled to the compressor section;
a gearbox assembly, the fan shaft coupled to the low-pressure shaft through the gearbox assembly, wherein the gearbox assembly comprises:
   a gearbox having a gearbox volume defined by an outer diameter of the gearbox and a gearbox length of the gearbox; and
   a gutter for collecting a gearbox lubricant scavenge flow from the gearbox, the gutter having a gutter volume defined by an inner surface of a gutter wall of the gutter and being characterized by a lubricant extraction volume ratio between 0.01 and 0.3, inclusive of the endpoints, for a maximum gearbox power greater than 35 kHP and less than or equal to 90 kHP, or the lubrication extraction volume ratio is between 0.03 to 0.3, inclusive of the endpoints, for a maximum gearbox power less than or equal to 35 kHP, the lubricant extraction volume ratio defined by:

$$\frac{V_G}{V_{GB}},$$

wherein $V_G$ is the gutter volume of the gutter and $V_{GB}$ is the gearbox volume; and
a lubricant flow control system comprising:
   a variable flow lubricant pump that generates a pump variable flow of lubricant to the gearbox assembly during operation of the gas turbine engine, the gearbox assembly having a variable consumption demand for delivery of lubricant; and
   a lubricant flow controller configured to generate a pump control command for the variable flow lubricant pump to produce the pump variable flow of lubricant based on the variable consumption demand of the gearbox assembly.

2. The gas turbine engine of claim 1, wherein the lubricant flow control system includes a lubricant tank in fluid communication with the variable flow lubricant pump and a heat exchanger in fluid communication with the variable flow lubricant pump.

3. The gas turbine engine of claim 2, wherein the heat exchanger is in downstream fluid communication with the variable flow lubricant pump and upstream fluid communication with the gearbox assembly.

4. The gas turbine engine of claim 1, wherein the lubricant flow control system includes a lubricant flow control valve in fluid communication with the variable flow lubricant pump, the lubricant flow control valve configured to change the pump variable flow of lubricant to a valve variable flow of lubricant through operation of the lubricant flow control valve, and the gearbox assembly is configured to receive the valve variable flow of lubricant.

5. The gas turbine engine of claim 4, wherein the lubricant flow controller is configured to generate a valve command for the lubricant flow control valve based on the variable consumption demand of the gearbox assembly.

6. The gas turbine engine of claim 5, wherein the lubricant flow control system includes a flow rate sensor in fluid communication with the gearbox assembly, the flow rate sensor configured to generate flow rate data indicative of the valve variable flow of lubricant to the gearbox assembly.

7. The gas turbine engine of claim 1, wherein the lubricant flow control system includes a plurality of lubricant consumers including the gearbox assembly.

8. The gas turbine engine of claim 7, wherein each of the plurality of lubricant consumers including a variable consumption demand, and during operation of the plurality of lubricant consumers, the lubricant flow controller determines the pump control command based on an aggregate of the variable consumption demand of the plurality of lubricant consumers.

9. The gas turbine engine of claim 7, wherein the plurality of lubricant consumers is arranged in a parallel lubricant flow arrangement with each other.

10. The gas turbine engine of claim 7, wherein the plurality of lubricant consumers includes at least one of an engine bearing, an accessory, or an electrical generator.

11. The gas turbine engine of claim 1, wherein the lubricant flow control system includes a first flow rate sensor in fluid communication with the gearbox assembly, the first flow rate sensor configured to generate first flow rate data indicative of a rate of lubricant to the gearbox assembly.

12. The gas turbine engine of claim 11, wherein the lubricant flow controller is configured to generate the pump control command for the variable flow lubricant pump based on the first flow rate data from the first flow rate sensor.

13. The gas turbine engine of claim 11, wherein the lubricant flow control system includes a second flow rate sensor positioned downstream of the gearbox assembly configured to generate second flow rate data indicative of a rate of lubricant from the gearbox assembly.

14. The gas turbine engine of claim 13, wherein the lubricant flow controller is configured to generate the pump control command for the variable flow lubricant pump based on the second flow rate data from the second flow rate sensor.

15. A gas turbine engine comprising:
a fan having a fan shaft;
a turbo-engine including a compressor section, a combustion section, and a turbine section, the turbine section having a low-pressure shaft drivingly coupled to the compressor section;
a gearbox assembly, the fan shaft coupled to the low-pressure shaft through the gearbox assembly, wherein the gearbox assembly comprises:
   a gearbox having a gearbox volume defined by an outer diameter of the gearbox and a gearbox length of the gearbox; and
   a gutter for collecting a gearbox lubricant scavenge flow from the gearbox, the gutter having a gutter volume defined by an inner surface of a gutter wall of the gutter and being characterized by a lubricant extraction volume ratio between 0.01 and 0.3, inclusive of the endpoints, for a maximum gearbox power greater than 35 kHP and less than or equal to 90 kHP, or the lubrication extraction volume ratio is between 0.03 to 0.3, inclusive of the endpoints, for a maximum gearbox power less than or equal to 35 kHP, the lubricant extraction volume ratio defined by:

$$\frac{V_G}{V_{GB}},$$

wherein $V_G$ is the gutter volume of the gutter and $V_{GB}$ is the gearbox volume; and a lubricant flow control system comprising:

a variable flow lubricant pump that generates a pump variable flow of lubricant during operation of the gas turbine engine;

a lubricant flow control valve in fluid communication with the variable flow lubricant pump, the lubricant flow control valve configured to change the pump variable flow of lubricant to a valve variable flow of lubricant through operation of the lubricant flow control valve, wherein the gearbox assembly is configured to receive the valve variable flow of lubricant, the gearbox assembly having a variable consumption demand for delivery of the lubricant; and a lubricant flow controller configured to generate a valve control command for the lubricant flow control valve based on the variable consumption demand of the gearbox assembly.

16. The gas turbine engine of claim 15, wherein the lubricant flow control system includes a flow rate sensor in fluid communication with the gearbox assembly, the flow rate sensor configured to generate flow rate data indicative of the valve variable flow of lubricant to the gearbox assembly.

17. The gas turbine engine of claim 16, wherein the lubricant flow controller is configured to generate a pump control command for the variable flow lubricant pump to produce the pump variable flow of lubricant based on the flow rate data from the flow rate sensor.

18. The gas turbine engine of claim 17, wherein the lubricant flow control system includes a plurality of lubricant consumers including the gearbox assembly, each of the plurality of lubricant consumers including a variable consumption demand, and during operation of the plurality of lubricant consumers, the lubricant flow controller determines the pump control command based on an aggregate of the variable consumption demand of the plurality of lubricant consumers.

19. The gas turbine engine of claim 17, wherein the flow rate sensor is a first flow rate sensor, and the lubricant flow control system includes a second flow rate sensor positioned downstream of the gearbox assembly configured to generate second flow rate data indicative of a rate of lubricant from the gearbox assembly.

20. The gas turbine engine of claim 19, wherein the lubricant flow controller is configured to generate the pump control command for the variable flow lubricant pump based on the second flow rate data from the second flow rate sensor.

* * * * *